United States Patent
Tokumo et al.

(10) Patent No.: US 12,483,726 B2
(45) Date of Patent: Nov. 25, 2025

(54) 3D DATA DECODING APPARATUS AND 3D DATA CODING APPARATUS

(71) Applicant: SHARP KABUSHIKI KAISHA, Sakai (JP)

(72) Inventors: Yasuaki Tokumo, Sakai (JP); Keiichiro Takada, Sakai (JP); Tomohiro Ikai, Sakai (JP); Takeshi Chujoh, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 15 days.

(21) Appl. No.: 18/583,932

(22) Filed: Feb. 22, 2024

(65) Prior Publication Data
US 2025/0016371 A1   Jan. 9, 2025

(30) Foreign Application Priority Data
Jul. 5, 2023   (JP) ................................. 2023-110434

(51) Int. Cl.
*H04N 19/597* (2014.01)
*H04N 19/46* (2014.01)
*H04N 19/91* (2014.01)

(52) U.S. Cl.
CPC .......... *H04N 19/597* (2014.11); *H04N 19/46* (2014.11); *H04N 19/91* (2014.11)

(58) Field of Classification Search
None
See application file for complete search history.

(56) References Cited

U.S. PATENT DOCUMENTS

2016/0353110 A1* 12/2016 Zhang .................... H04N 19/46
2023/0290011 A1*  9/2023 Kim ........................ G06T 9/004

FOREIGN PATENT DOCUMENTS

WO      2024/079981 A1    4/2024

OTHER PUBLICATIONS

"Information technology—Coded representation of immersive media—Part 29: Video-based dynamic mesh coding (V-DMC)", ISO 23090-29:2023(E), ISO/IEC JTC 1/SC 29/WG 7, Date: May 19, 2023.
Yasuaki Tokumo et al., "[V-DMC][EE4.7-related] [New] Improvement of displacement coefficients arithmetic coding", 143. MPEG Meeting, Jul. 17, 2023-Jul. 21, 2023, Geneva, ISO/IEC JTC 1/SC 29/WG 7, m63943, pp. 1-4, XP93186440, [retrieved on Jul. 17, 2024].

* cited by examiner

*Primary Examiner* — Christopher Braniff
(74) *Attorney, Agent, or Firm* — ScienBiziP, P.C.

(57) ABSTRACT

An arithmetic coding scheme is provided for coding and decoding 3D data and improves coding efficiency for mesh displacements and high-quality coding, and decoding of the 3D data. A 3D data decoding apparatus is also provided for decoding coded data. The apparatus contains an arithmetic decoder that is configured to arithmetically decode a mesh displacement from the coded data. The arithmetic decoder decodes, from the coded data, a first flag indicating whether a coefficient of the mesh displacement has an absolute value greater than 0, a second flag indicating whether the coefficient has an absolute value greater than 1, and a third flag indicating whether the coefficient has an absolute value greater than 2.

6 Claims, 16 Drawing Sheets

| atlas_sequence_parameter_set_rbsp( ) { | Descriptor |
|---|---|
| asps_atlas_frame_parameter_set_id | ue(v) |
| ... | |
| asps_extension_present_flag | u(1) |
| if( asps_extension_present_flag ) { | |
| asps_miv_extension_present_flag | u(1) |
| asps_vpcc_extension_present_flag | u(1) |
| asps_vdmc_extension_present_flag | u(1) |
| asps_extension_5bits | u(5) |
| } | |
| ... | |
| if( asps_vdmc_extension_present_flag ) | |
| asps_vdmc_extension( ) | |
| ... | |
| } | |

| asps_vdmc_extension( ) { | Descriptor |
|---|---|
| asps_vdmc_ext_subdivision_iteration_count | u(8) |
| asps_vdmc_ext_displacement_coordinate_system | u(3) |
| asps_vdmc_ext_1d_displacement_flag | u(1) |
| } | |

FIG. 7

| atlas_frame_parameter_set_rbsp( ) { | Descriptor |
|---|---|
| afps_atlas_frame_parameter_set_id | ue(v) |
| ... | |
| afps_extension_present_flag | u(1) |
| if( afps_extension_present_flag ) { | |
| afps_miv_extension_present_flag | u(1) |
| afps_vpcc_extension_present_flag | u(1) |
| afps_vdmc_extension_present_flag | u(1) |
| afps_extension_5bits | u(5) |
| } | |
| ... | |
| if( asps_vdmc_extension_present_flag ) | |
| afps_vdmc_extension( ) | |
| ... | |
| } | |

| afps_vdmc_extension( ) { | Descriptor |
|---|---|
| afps_vdmc_ext_overriden_flag | u(1) |
| if ( afps_vdmc_ext_overriden_flag ) { | |
| afps_vdmc_ext_subdivision_iteration_count | u(8) |
| afps_vdmc_ext_displacement_coordinate_system | u(3) |
| afps_vdmc_ext_1d_displacement_flag | u(1) |
| } | |
| } | |

FIG. 8

BASE MESH

SUBDIVIDED MESH

DEFORMED MESH

○ : VERTEX

↗ : MESH DISPLACEMENT

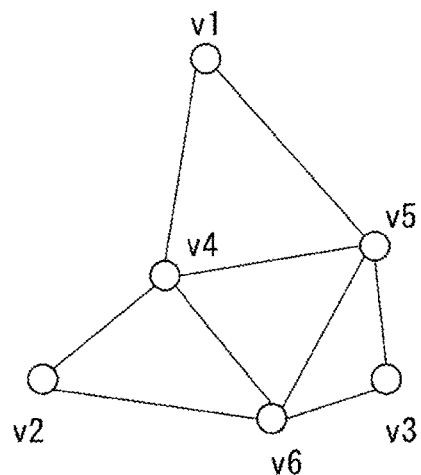
FIG. 14A MESH
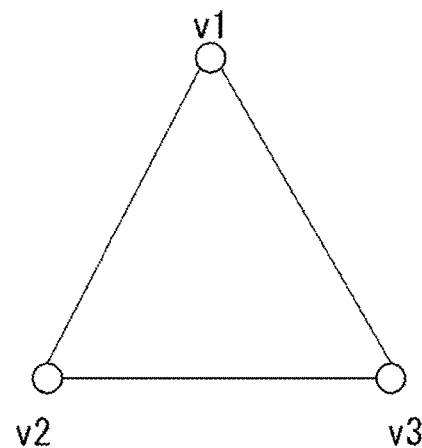
FIG. 14B BASE MESH
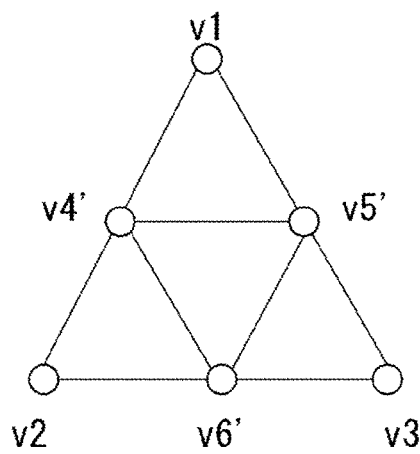
FIG. 14C SUBDIVIDED MESH
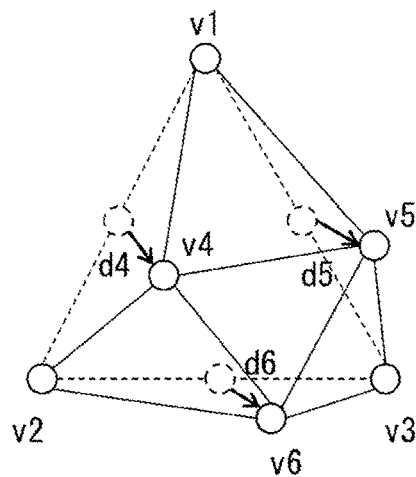
FIG. 14D MESH DISPLACEMENT
○ : VERTEX
↗ : MESH DISPLACEMENT

| | Descriptor |
|---|---|
| displ_unit( unitSize, lodCount, subBlockSize, vertexCount ) { | |
|   for( k = 0; k < 3; k++ ) { | |
|     diu_last_sig_coeff[ k ] | ae(v) |
|     for( b = 0; b < lodCount; b++ ) { | |
|       diu_coded_block_flag[ k ][ b ] | u(v) |
|       if( diu_coded_block_flag[ k ][ b ] ) { | |
|         for( s = 0; s < vertexCount[ b ] % subBlockSize; s++ ) { | |
|           diu_coded_subblock_flag[ k ][ b ][ s ] | u(v) |
|           if( diu_coded_subblock_flag[ k ][ b ][ s ] ) { | |
|             for( v = vStart; v < subBlockSize; v++ ) { | |
|               diu_coeff_abs_level_gt0[ k ][ b ][ s ][ v ] | u(v) |
|               if( diu_coeff_abs_level_gt0[ k ][ b ][ s ][ v ] ) { | |
|                 diu_coeff_sign[ k ][ b ][ s ][ v ] | u(1) |
|                 diu_coeff_abs_level_gt1[ k ][ b ][ s ][ v ] | u(v) |
|                 if( diu_coeff_abs_level_gt1[ k ][ b ][ s ][ v ] ) { | |
|                   diu_coeff_abs_level_gt2[ k ][ b ][ s ][ v ] | u(v) |
|                   if( diu_coeff_abs_level_gt2[ k ][ b ][ s ][ v ] ) { | |
|                     diu_coeff_abs_level_gt3[ k ][ b ][ s ][ v ] | u(v) |
|                     if( diu_coeff_abs_level_gt3[ k ][ b ][ s ][ v ] ) { | |
|                       diu_coeff_abs_level_rem[ k ][ b ][ s ][ v ] | ue(v) |
|                     } | |
|                   } | |
|                 } | |
|               } | |
|             } | |
|           } | |
|         } | |
|       } | |
|     if ( dsps_single_dimension_flag ) { | |
|       break; | |
|     } | |
|   } | |
| } | |

| displ_unit( unitSize, lodCount, subBlockSize, vertexCount ) { | Descriptor |
|---|---|
|   for( k = 0; k < 3; k++ ) { | |
|     diu_last_sig_coeff[ k ] | ae(v) |
|     for( b = 0; b < lodCount; b++ ) { | |
|       diu_coded_block_flag[ k ][ b ] | u(v) |
|       if( diu_coded_block_flag[ k ][ b ] ) { | |
|         for( s = 0; s < vertexCount[ b ] % subBlockSize; s++ ) { | |
|           diu_coded_subblock_flag[ k ][ b ][ s ] | u(v) |
|           if( diu_coded_subblock_flag[ k ][ b ][ s ] ) { | |
|             for( v = vStart; v < subBlockSize; v++ ) { | |
|               diu_coeff_abs_level_gt0[ k ][ b ][ s ][ v ] | u(v) |
|               if( diu_coeff_abs_level_gt0[ k ][ b ][ s ][ v ] ) { | |
|                 diu_coeff_sign[ k ][ b ][ s ][ v ] | u(1) |
|                 diu_coeff_abs_level_gt1[ k ][ b ][ s ][ v ] | u(v) |
|                 if( diu_coeff_abs_level_gt1[ k ][ b ][ s ][ v ] ) { | |
|                   diu_coeff_abs_level_rem[ k ][ b ][ s ][ v ] | ue(v) |
|                 } | |
|               } | |
|             } | |
|           } | |
|         } | |
|       } | |
|     if ( dsps_single_dimension_flag ) { | |
|       break; | |
|     } | |
|   } | |
| } | |

FIG.16B

| Syntax Name | | CtxInc (CtxIdx) |
|---|---|---|
| diu_coeff_abs_level_gt0 | | 0 |
| diu_coeff_abs_level_gt1 | | 0 |
| diu_coeff_sign | | bypass |
| diu_coeff_abs_level_rem | prefix bin==0 | 0 |
| | prefix bin==1 | 1 |
| | prefix bin>=2 | bypass |
| | suffix | bypass |

3D DATA DECODING APPARATUS AND 3D DATA CODING APPARATUS

RELATED APPLICATIONS

This application claims the benefit of Japanese Patent Application No. 2023-110434, filed on Jul. 5, 2023, which is hereby incorporated by reference in its entirety.

TECHNICAL FIELD

Embodiments of the present invention relate to a 3D data coding apparatus and a 3D data decoding apparatus.

BACKGROUND ART

Apparatuses used to efficiently transmit or record 3D data contain a 3D data coding apparatus that converts 3D data into a two dimensional image and encodes the two dimensional image by a video coding scheme to generate a coded data, and a 3D data decoding apparatus that decodes the two dimensional image from the coded data to reconstruct the 3D data.

Specific examples of the 3D data coding scheme include ISO/IEC 23090-5 Volumetric Video-based Coding (V3C) and Video-based Point Cloud Compression (V-PCC) of MPEG-I. V3C enables coding and decoding of a point cloud including the positions of points and attribute information. Furthermore, according to ISO/IEC 23090-12 (MPEG Immersive Video, MIV) and ISO/IEC 23090-29 (Video-based Dynamic Mesh Coding, V-DMC) under standardization, V3C is also used for coding and decoding of multi-view video and mesh video. For the V-DMC scheme, the latest draft is disclosed in NPL 1.

These 3D data coding schemes use, as images, geometries and attributes constituting 3D data to perform coding and decoding using a video coding scheme such as H. 265/High Efficiency Video Coding (HEVC) or H. 266/Versatile Video Coding (VVC).

In a case of a point group, a geometry image is a depth to a projection plane, and an attribute image is an image obtained by projecting an attribute onto the projection plane.

The 3D data (mesh) as described in NPL 1 includes a base mesh, a mesh displacement, and a texture-mapped image. A vertex coding scheme such as Draco can be used for coding the base mesh. Methods for coding the mesh displacement include direct coding by arithmetic coding, in addition to a method of using video codec to encode a mesh displacement image obtained by two dimensionally converting the mesh displacement. The texture-mapped image is coded as an attribute image by a video codec. As a video codec, the above-described HEVC and VVC can be used.

CITATION LIST

Non Patent Literature

NPL 1:
  WD 3.0 of V-DMC (MDS22775_WG07_N00611_d9), ISO/IEC JTC 1/SC 29/WG 7 N0611, April 2023

SUMMARY OF INVENTION

Technical Problem

The 3D data coding scheme disclosed in NPL 1 allows coding and decoding of mesh displacements (mesh displacement array, mesh displacement image) constituting 3D data (mesh) using an arithmetic coding scheme. A problem with arithmetic coding of mesh displacements is that coding efficiency is not good because the performance of the coding depends on syntaxes and contexts.

An object of the present invention is to achieve, in coding and decoding of 3D data using an arithmetic coding scheme, improved coding efficiency for mesh displacements and high-quality coding and decoding of the 3D data.

Solution to Problem

According to an aspect of the present invention, to solve the above-described problems, a 3D data decoding apparatus for decoding coded data is provided, the 3D data decoding apparatus including an arithmetic decoder configured to arithmetically decode a mesh displacement from the coded data, and the arithmetic decoder decodes, from the coded data, a first flag indicating whether a coefficient of the mesh displacement has an absolute value of greater than 0, a second flag indicating whether the coefficient has an absolute value of greater than 1, and a third flag indicating whether the coefficient has an absolute value of greater than 2.

According to an aspect of the present invention, to solve the above-described problems, a 3D data coding apparatus for coding 3D data is provided, the 3D data coding apparatus including an arithmetic encoder configured to arithmetically encode a mesh displacement, wherein the arithmetic encoder encodes, into coded data, a first flag indicating whether a coefficient of the mesh displacement has an absolute value of greater than 0, a second flag indicating whether the coefficient has an absolute value of greater than 1, and a third flag indicating whether the coefficient has an absolute value of greater than 2.

Advantageous Effects of Invention

An aspect of the present invention allows improvement of coding efficiency for mesh displacements and high-quality coding and decoding of 3D data.

BRIEF DESCRIPTION OF DRAWINGS

FIG. 7 is a diagram illustrating an example of a syntax for a configuration for transmitting coordinate transformation parameters and context initialization parameters at a sequence level (ASPS).

FIG. 8 is a diagram illustrating an example of a syntax of a configuration for transmitting coordinate transformation parameters and context initialization parameters at a picture/frame level (AFPS).

FIGS. 14A to 14D are diagrams for describing operation of the mesh separation unit 115.

FIG. 15 is an example of a syntax structure for mesh displacements.

FIGS. 16A and 16B are diagrams illustrating a syntax structure of mesh displacements and a method for deriving a context.

DESCRIPTION OF EMBODIMENTS

Hereinafter, an embodiment of the present invention will be described with reference to the drawings.

Figure 1:
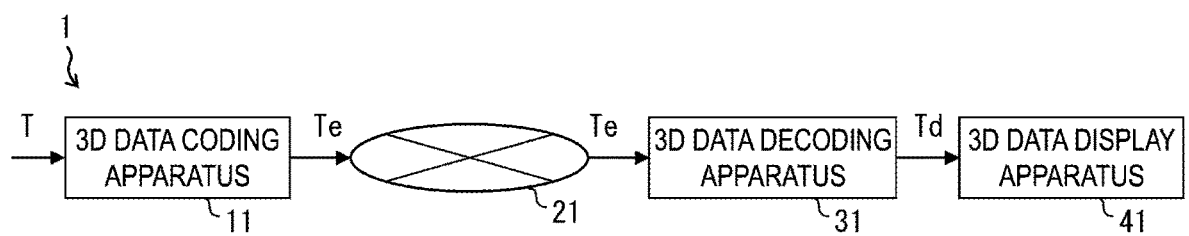
FIG. 1 is a schematic diagram illustrating a configuration of a 3D data transmission system according to the present embodiment.

FIG. 1 is a schematic diagram illustrating a configuration of a 3D data transmission system 1 according to the present embodiment.

The 3D data transmission system 1 is a system that transmits a coding stream obtained by coding a coding target 3D data, decodes the transmitted coding stream, and displays 3D data. The 3D data transmission system 1 contains a 3D data coding apparatus 11, a network 21, a 3D data decoding apparatus 31. and an 3D data display apparatus 41.

3D data T is input to the 3D data coding apparatus 11.

The network 21 transmits, to the 3D data decoding apparatus 31, a coding stream Te generated by the 3D data coding apparatus 11. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD: trade name) or a Blu-ray Disc (BD: trade name).

The 3D data decoding apparatus 31 decodes each of coding streams Te transmitted by the network 21 to generate one or multiple decoded 3D data Td thus decoded.

The 3D data display apparatus 41 displays all or part of the one or multiple decoded 3D data Td generated by the 3D data decoding apparatus 31. For example, the 3D data display apparatus 41 contains a display device such as a liquid crystal display and an organic Electro-Luminescence (EL) display. Forms of the display include a stationary type, a mobile type, an HMD type, and the like. In a case that the 3D data decoding apparatus 31 has a high processing capability, an image having high image quality is displayed, and in a case that the apparatus has a lower processing capability, an image that does not require high processing capability and display capability is displayed.

Operator

Operators used in the present specification will be described below.

>> is a right bit shift, << is a left bit shift, & is a bitwise AND, | is a bitwise OR, |= is an OR assignment operator, and || indicates a logical sum.

x? y: z is a ternary operator that takes y in a case that x is true (other than 0) and takes z in a case that x is false (0).

y . . . z indicates the set of integers from y to z.

Structure of Coding Stream Te

Prior to the detailed description of the 3D data coding apparatus 11 and the 3D data decoding apparatus 31 according to the present embodiment, a data structure of the coding stream Te generated by the 3D data coding apparatus 11 and decoded by the 3D data decoding apparatus 31 will be described.

Figure 2:
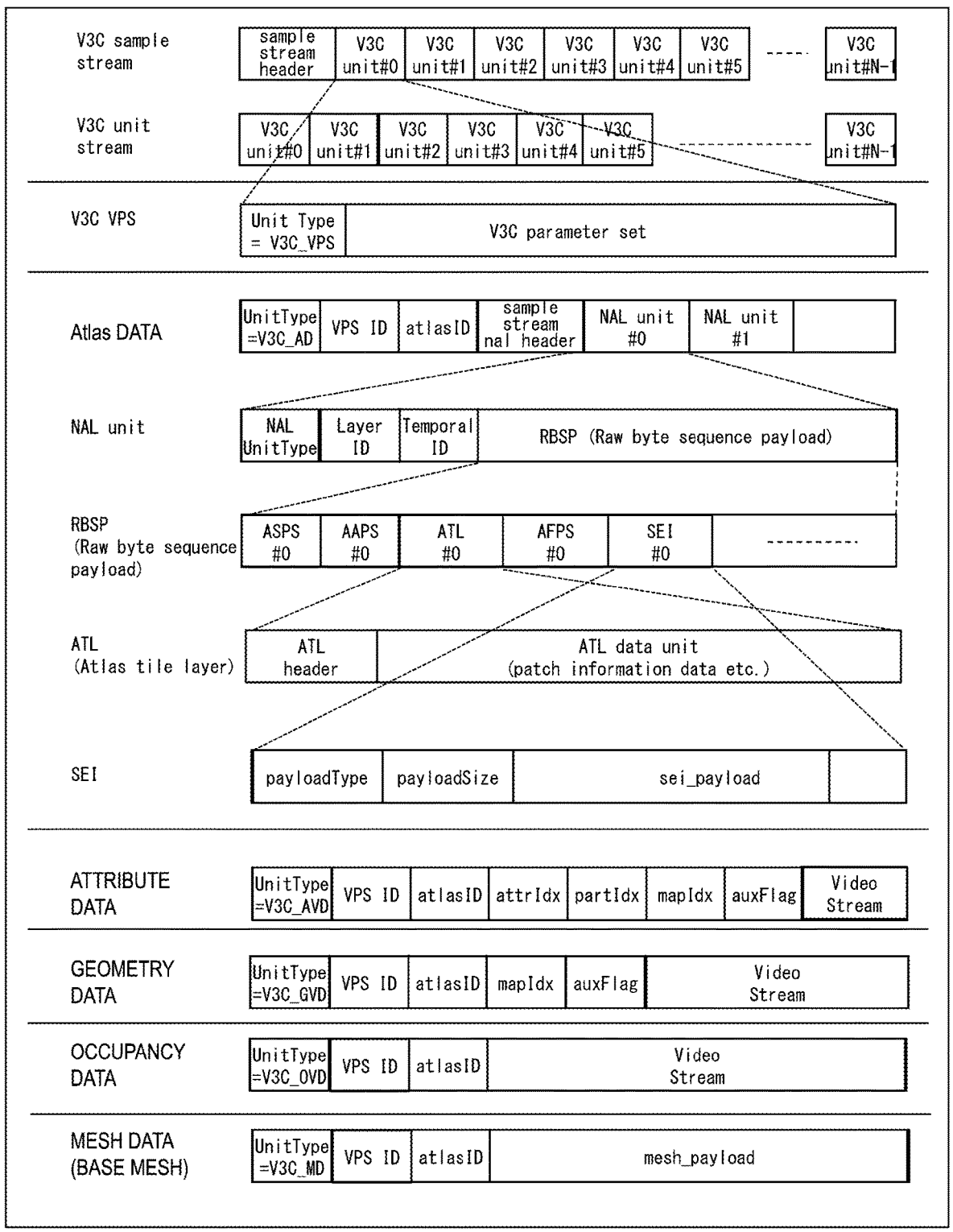
FIG. 2 is a diagram illustrating a hierarchical structure of data of a coding stream.

FIG. 2 illustrates diagrams illustrating the hierarchy structure of data in the coding stream Te. The coding stream Te has either a V3C sample stream data structure or a V3C unit stream data structure. The V3C sample stream contains a sample stream header and a V3C unit. The V3C unit stream contains a V3C unit.

The V3C unit contains a V3C unit header and a V3C unit payload. The V3C unit header is a Unit Type that is an ID indicating the type of the V3C unit, and takes a value indicated by a label such as V3C_VPS, V3C_AD, V3C_AVD, V3C_GVD, or V3C_OVD.

When the Unit Type is V3C_VPS (Video Parameter Set), the V3C unit contains a V3C parameter set.

When the Unit Type is V3C_AD (Atlas Data, Atlas data), the V3C unit contains a VPS ID, atlasID, a sample stream nal header, and multiple NAL units. The atlasID is Identification (ID) and takes an integer value of 0 or more.

The NAL unit contains NALUnitType, layerID, TemporalID, and Raw byte sequence payload (RBSP).

The NAL unit is identified by NALUnitType and contains an Atlas Sequence Parameter Set (ASPS), an Atlas Adaptation Parameter Set (AAPS), an Atlas Tile layer (ATL), Supplemental Enhancement Information (SEI), and the like.

The ATL contains an ATL header and an ATL data unit. The ATL data unit contains patch information data and the like, which are information such as the location and size of a patch.

The SEI contains payloadType indicating the type of the SEI, payloadSize indicating the size (number of bytes) of the SEI, and sei_payload of the data of the SEI.

When the Unit Type is V3C_AVD (Attribute Video Data, attribute data), the V3C unit contains the VPS ID, atlasID, attrIdx, which is an ID of an attribute image, partIdx, which is a partition ID, mapIdx, which is a map ID, auxFlag, which is a flag indicating whether the data is Auxiliary data, and a video stream. The video stream is data coded by HEVC, VVC, or the like. The attribute data corresponds to a texture image in the V-DMC.

When the Unit Type is V3C_GVD (Geometry Video Data, geometry data), the V3C unit contains the VPS ID, atlasID, mapIdx, auxFlag, and the video stream. The geometry data corresponds to mesh displacements in the V-DMC.

When the Unit Type is V3C_OVD (Occupancy Video Data, occupancy data), the V3C unit contains the VPS ID, atlasID, and the video stream.

When the Unit Type is V3C_MD (Mesh data), the V3C unit contains the VPS ID, atlasID, and mesh_payload. In the V-DMC, the V3C unit corresponds to the base mesh.

Configuration of 3D Data Decoding Apparatus According to First Embodiment

Figure 3:
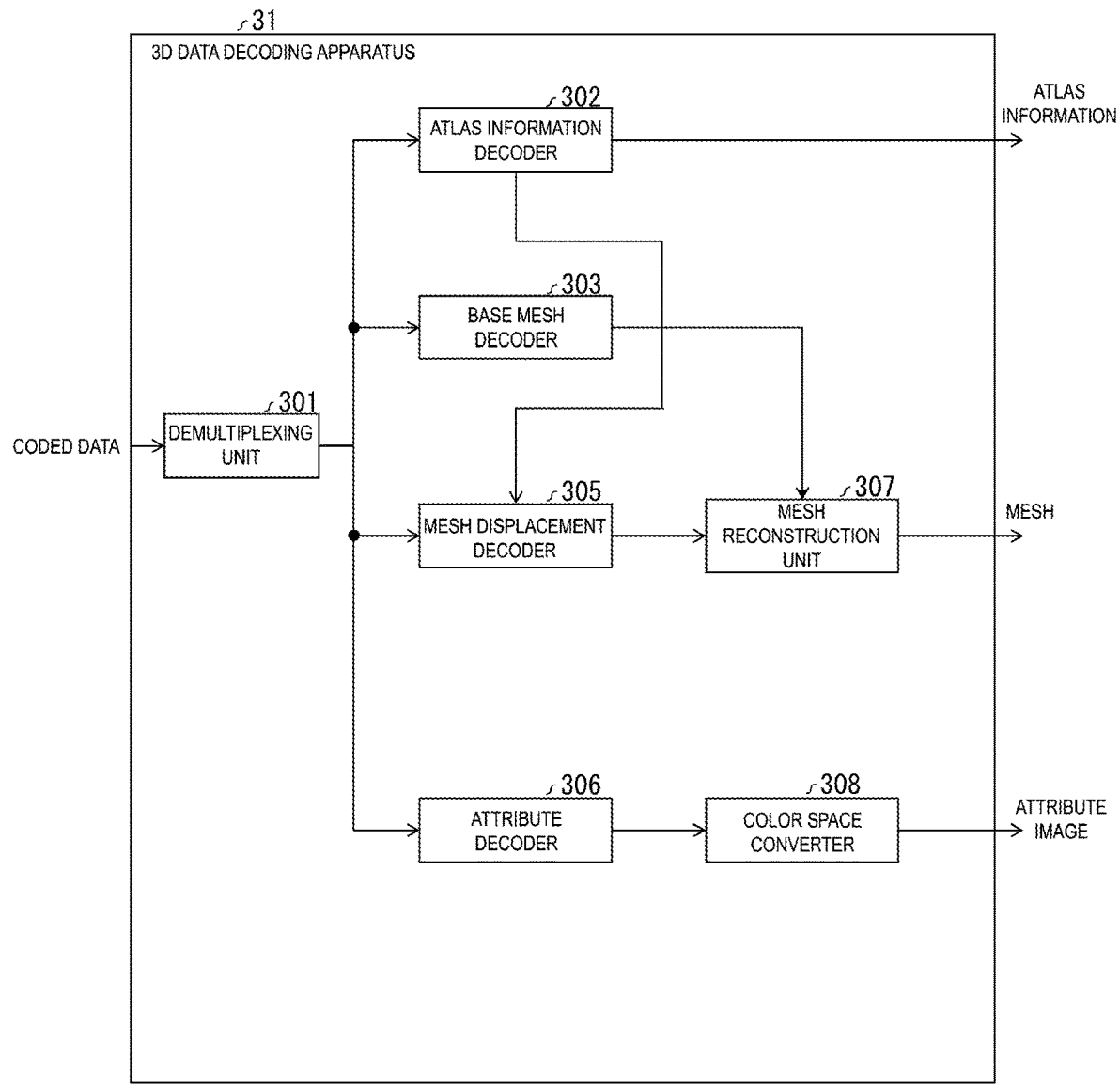
FIG. 3 is a functional block diagram illustrating a schematic configuration of a 3D data decoding apparatus 31.

FIG. 3 is a functional block diagram illustrating a schematic configuration of the 3D data decoding apparatus 31 according to a first embodiment. The 3D data decoding apparatus 31 contains a demultiplexing unit 301, an atlas information decoder 302, a base mesh decoder 303, a mesh displacement decoder 305, a mesh reconstruction unit 307, an attribute decoder 306, and a color space converter 308. The 3D data decoding apparatus 31 receives the coded data of 3D data and outputs atlas information, meshes, and attribute images.

The demultiplexing unit 301 receives and demultiplexes coded data multiplexed in a byte stream format, an ISO Base Media File Format (ISOBMFF), or the like, and outputs an atlas information coding stream (Atlas Data stream or NAL units in V3C_AD), a base mesh coding stream (mesh_payload in V3C_MD), a mesh displacement coding stream (video stream in V3C_GVD), and an attribute video stream (video stream in V3C_AVD).

The atlas information decoder 302 receives an atlas information coding stream output from the demultiplexing unit 301, and decodes atlas information.

The atlas information decoder 302 in FIG. 3 decodes coded data to obtain coordinate system conversion information displacementCoordinateSystem (asps_vdmc_ext_displacement_coordinate_system, afps_vdmc_ext_displacement_coordinate_system) indicating a coordinate system. Note that a gating flag may be separately provided, and each piece of coordinate system conversion information may be decoded only in a case that the gating flag is 1. The gating flag is, for example, afps_vdmc_ext_displacement_coordinate_system_enable_flag.

The base mesh decoder 303 decodes a base mesh coding stream obtained by vertex coding (3D data compression coding scheme, for example, Draco) and outputs a base mesh. The base mesh will be described below.

The mesh displacement decoder 305 decodes a mesh displacement coding stream and outputs mesh displacements.

The mesh reconstruction unit 307 receives a base mesh and mesh displacements and reconstructs the mesh in the 3D space.

The attribute decoder 306 decodes an attribute video stream obtained by coding such as VVC or HEVC, and outputs an attribute image. The attribute image may be a texture image (a texture mapped image obtained by conversion by a UV atlas method) expanded on a UV axis and may be in a YCbCr format. The type of a codec used for coding is indicated by ptl_profile_codec_group_idc obtained by decoding the V3C parameter set of the coded data. The type of the codec may be indicated by a Four CC code indicated by ai_geometry_codec_id[atlasID] of the V3C parameter set. ai_geometry_codec_id[atlasID] indicates an index corresponding to the codec ID of a decoder used for decoding an attribute video stream in atlasID.

The color space converter 308 performs color space conversion of an attribute image from a YCbCr format to an RGB format. The attribute video stream coded in the RGB format may be decoded, and the color space conversion may be omitted.

Decoding of Base Mesh

Figure 4:
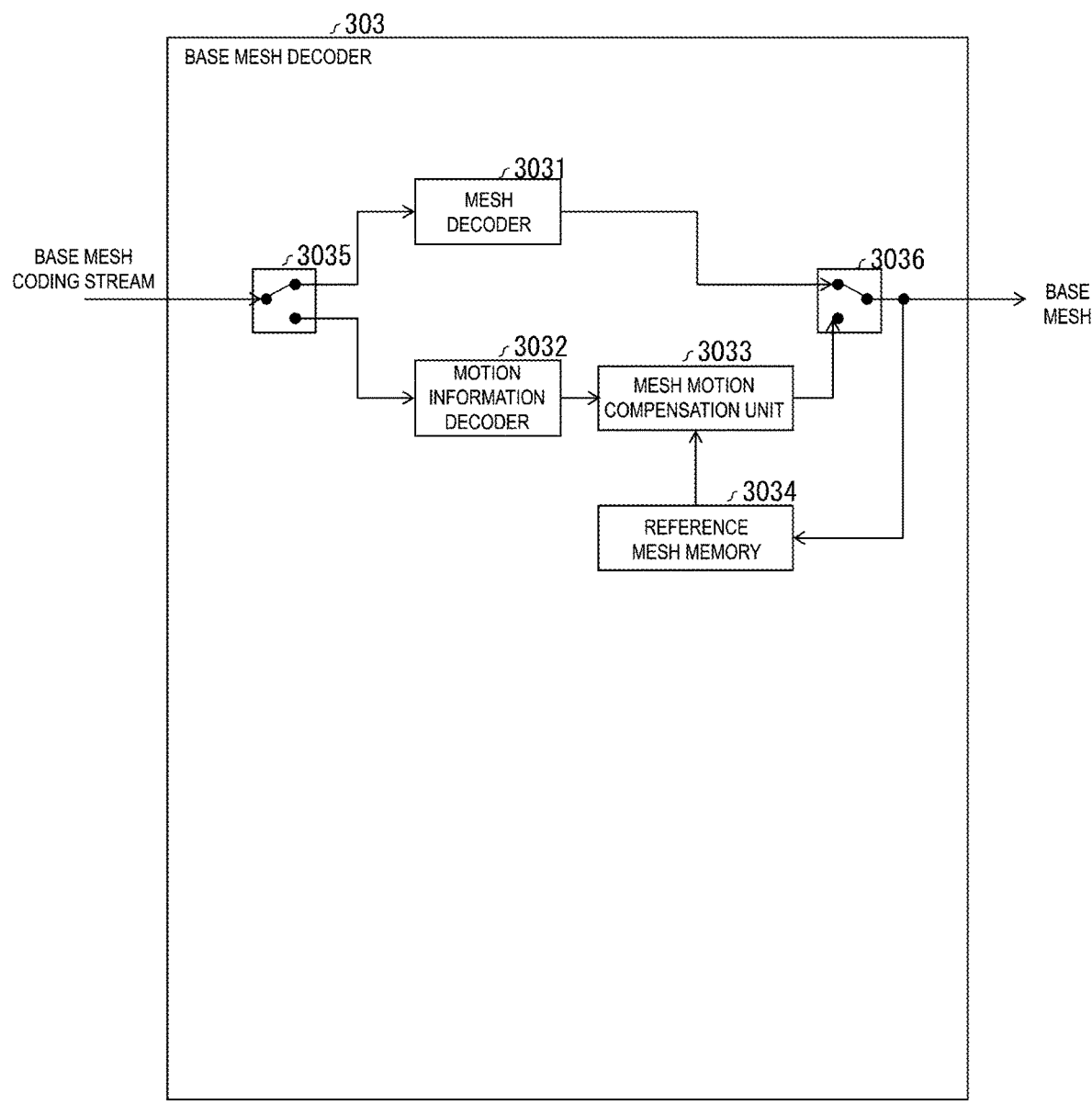
FIG. 4 is a functional block diagram illustrating a configuration of a base mesh decoder 303.

FIG. 4 is a functional block diagram illustrating a configuration of the base mesh decoder 303. The base mesh decoder 303 contains a mesh decoder 3031, a motion information decoder 3032, a mesh motion compensation unit 3033, a reference mesh memory 3034, a switch 3035, and a switch 3036. The base mesh decoder 303 may contain a base mesh inverse quantization unit (not illustrated) preceding an output for a base mesh. In a case that a base mesh to be decoded is obtained by coding (intra-coding) without referring to another base mesh (for example, a base mesh that has already coded and decoded), the switch 3035 and the switch 3036 are connected to a side where motion compensation is not performed. Otherwise, in a case that the base mesh to be decoded is obtained by coding (inter-coding) with reference to another base mesh, the switch 3035 and the switch 3036 are connected to a side where motion compensation is performed. In a case that motion compensation is performed, the vertex coordinates of the target are derived with reference to already decoded vertex coordinates and motion information.

The mesh decoder 3031 decodes the base mesh coding stream obtained by intra-coding, and outputs a base mesh. The coding scheme used is Draco, edge breaker, or the like.

The motion information decoder 3032 decodes the base mesh coding stream obtained by inter-coding, and outputs motion information for each vertex of a reference mesh described below. The coding scheme used is entropy coding such as arithmetic coding.

The mesh motion compensation unit 3033 performs motion compensation on each vertex of the reference mesh received from the reference mesh memory 3034 based on the motion information, and outputs a motion-compensated mesh.

The reference mesh memory 3034 is a memory that holds a decoded mesh to be referred to in subsequent decoding processing.

Decoding of Mesh Displacements

Figure 5:
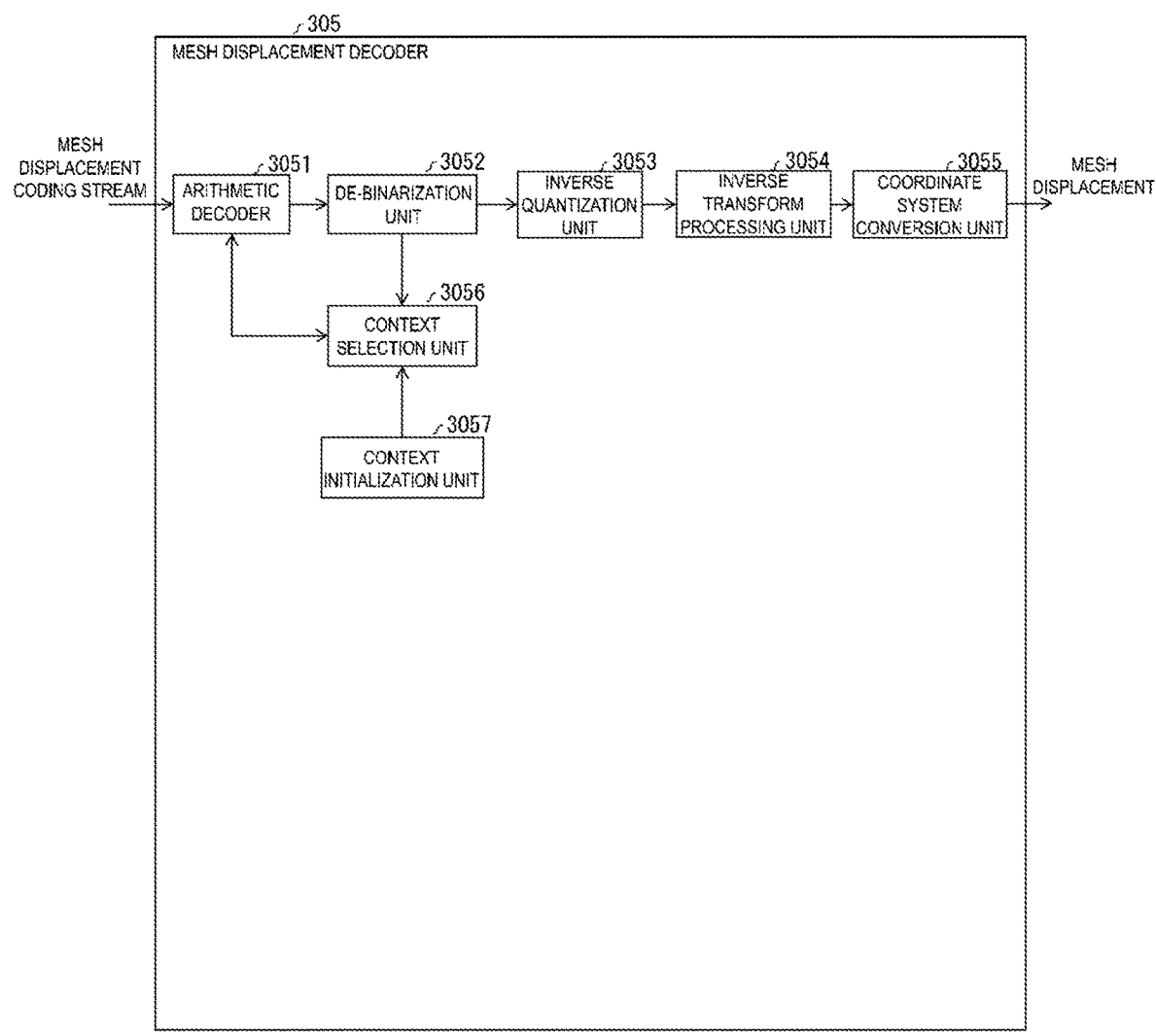
FIG. 5 is a functional block diagram illustrating a configuration of a mesh displacement decoder 305.

FIG. 5 is a functional block diagram illustrating a configuration of the mesh displacement decoder 305. The mesh displacement decoder 305 contains a CABAC decoder (an arithmetic decoder 3051, a de-binarization unit 3052, a context selection unit 3056, and a context initialization unit 3057), an inverse quantization unit 3053, an inverse transform processing unit 3054, and a coordinate system conversion unit 3055.

Context-Adaptive Binary Arithmetic Coding

The arithmetic decoder 3051, the de-binarization unit 3052, the context selection unit 3056, and the context initialization unit 3057 use a decoding method using context, which is referred to as Context-Adaptive Binary Arithmetic Coding (CABAC). In CABAC, a binary string including 0s and 1s is encoded and decoded on a per-bit basis using a state variable (CABAC state) referred to as a context. All CABAC states are initialized at the beginning of a segment. The CABAC decoder decodes each bit of a binary string (Bin String) corresponding to a syntax element. In a case that a context is used, a context index ctxInc is derived for each bit of the syntax element, the bit is decoded using the context, and the CABAC state of the context is updated. Bits for which no context is used are decoded with equal probability (EP, bypass), and update of the index ctxIdx, indicating a context, and the specified context is omitted. The context is a variable (memory area) for holding the probability (state) of CABAC, and is identified by the value (0, 1, 2, . . . ) of ctxIdx. A case that 0 and 1 are always equal in probability, i.e., 0 and 1 both have a probability of 0.5, is called Equal Probability (EP) or bypass. In this case, no context is used because no state needs to be held for a particular syntax element. A static context may be used in which the probability is fixed at 0.5 and need not need be updated. In this sense, the context may be referred to as static rather than bypass. An integer value such as 128 may be used as a value indicating the probability of 0.5.

Note that the following pseudo code may be used for the processing of decoding one bit (by bypassing) without using a context.

```
rangeTimesProb = IvlRange >> 1
binVal = ( rangeTimesProb <= ( IvlCode - IvlLow ) )
if (binVal == 0)
    IvlRange = rangeTimesProb
else {
    IvlLow += rangeTimesProb
```

-continued

```
    IvlRange -= rangeTimesProb
}
```

Note that the following pseudo code may be used for the processing of decoding one bit using a context. Here, prob0 is a variable indicating the probability of the context.

```
rangeTimesProb = IvlRange * prob0 >> 16
binVal = ( rangeTimesProb <= ( IvlCode - IvlLow ) )
if (binVal == 0)
    IvlRange = rangeTimesProb
else {
    IvlLow += rangeTimesProb
    IvlRange -= rangeTimesProb
}
```

Coordinate System

As a coordinate system for mesh displacements (three dimensional vectors), the following two types of coordinate systems are used.

Cartesian coordinate system (canonical): an orthogonal coordinate system commonly defined for the entire 3D space. (X, Y, Z) coordinate system. An orthogonal coordinate system whose direction does not change at the same time (within the same frame or within the same tile).

Local coordinate system (local): an orthogonal coordinate system defined for each region or each vertex in the 3D space. An orthogonal coordinate system whose direction can be changed at the same time (within the same frame or within the same tile). Coordinate system with a normal axis (D), a tangent axis (U), and a bi-tangent axis (V). In other words, the local coordinate system is an orthogonal coordinate system including a first axis (D) indicated by a normal vector n_vec at a certain vertex (a plane including the certain vertex), and a second axis (U) and a third axis (V) indicated by two tangent vectors t_vec and b_vec orthogonal to the normal vector n_vec. n_vec, t_vec, and b_vec are three dimensional vectors. The (D, U, V) coordinate system may be referred to as a (n, t, b) coordinate system.

Decoding and Derivation of Control Parameter at Sequence Level

Here, control parameters used in the mesh displacement decoder 305 will be described.

FIG. 7 is an example of a syntax of a configuration in which a coordinate system conversion parameter is transmitted by the ASPS at a sequence level. The ASPS (Atlas Sequence Parameter Set or Atlas sequence mesh information) is one of the NAL units of the atlas information and contains syntax elements that apply to the atlas information coding stream. In the ASPS, the coordinate system conversion parameter is transmitted by an asps_vdmc_extension ( ) syntax. The semantics of each field are as follows:

asps_vdmc_ext_subdivision_iteration_count: a parameter indicating the number of mesh subdivision iterations.

asps_vdmc_ext_displacement_coordinate_system: coordinate system conversion information indicating a coordinate system for mesh displacements. The value being equal to a predetermined first value (e.g., 0) indicates a Cartesian coordinate system. The value being equal to another second value (e.g., 1) indicates a local coordinate system.

asps_vdmc_ext_ld_displacement_flag: a flag indicating whether the mesh displacement is one dimensional. The value being true indicates that the mesh displacement is one dimensional. The value being false indicates that the mesh displacement is three dimensional.

Decoding and Derivation of Control Parameters at Picture/Frame Level)

FIG. 8 is an example of syntax of a configuration in which a coordinate system conversion parameter is transmitted by the AFPS at a picture/frame level. The AFPS (Atlas Frame Parameter Set or Atlas frame mesh information) is one of the NAL units of the atlas information and contains syntax elements that apply to the atlas information coding stream. In the AFPS, the coordinate system conversion parameter is transmitted by an afps_vdmc_extension ( ) syntax. The semantics of each field are as follows:

afps_vdmc_ext_overriden_flag: a flag indicating whether to update the coordinate system for mesh displacements. In a case that this flag is equal to true, the coordinate system for mesh displacements is updated based on the value of afps_vdmc_ext_displacement_coordinate_system described below. In a case that this flag is equal to false, the coordinate system for mesh displacements is not updated.

afps_vdmc_ext_subdivision_iteration_count: a parameter indicating the number of mesh subdivision iterations.

afps_vdmc_ext_displacement_coordinate_system: coordinate system conversion information indicating the coordinate system of mesh displacements. The value being equal to a first value (e.g., 0) indicates a Cartesian coordinate system. The value being equal to a second value (e.g., 1) indicates a local coordinate system. In a case that syntax element is not present, the value is inferred to be a value decoded by the ASPS and a default coordinate system is the coordinate system indicated by the ASPS.

afps_vdmc_ext_ld_displacement_flag: a flag indicating whether the mesh displacement is one dimensional. The value being true indicates that the mesh displacement is one dimensional. The value being false indicates that the mesh displacement is three dimensional.

Mesh Displacement Syntax Structure

FIG. 15 is an example of the syntax structure for mesh displacements. The semantics are as follows. The mesh displacement is a row of values (coefficients) of a position pos and a k component and is represented by an array Qdisp[pos][k]. The displacement is a three dimensional signal in the Cartesian coordinate system (xyz) or the local coordinate system (ntb), and each component of the three dimensional displacement is referred to as a component. Here, a displacement Qdisp is a value resulting from discrete wavelet transform, lifting transform, DCT transform, or the like, and is also referred to as a coefficient. The component variable k takes a value of 0, 1, or 2. The variable name is not limited to k, and dim may be another variable name. The order of indices of QDisp may be reversed, in other words, Qdisp[k][pos] may be used instead of Qdisp[pos][k].

diu_last_sig_coeff[k]: an index indicating, in the k component, the final position of a non-zero mesh displacement coefficient.

diu_coded_block_flag[k][b]: indicates, in the k component, whether a block with an index b contains a non-zero mesh displacement coefficient. In a case that the block contains a non-zero mesh displacement coefficient, the value is 1, and otherwise the value is 0.

diu_coded_subblock_flag[k][b][s]: indicates, in the k component, whether a subblock with an index s of the block with the index b contains a non-zero mesh displacement coefficient. In a case that the subblock contains a non-zero mesh displacement coefficient, the value is 1, and otherwise the value is 0.

diu_coeff_abs_level_gt0[k][b][s][v]: indicates, in the k component, whether the non-zero mesh displacement coefficient of the vertex with an index v of the subblock with index s of the block with index b has an absolute value of greater than 0. In a case that the non-zero mesh displacement coefficient has an absolute value of greater than 0, the value is 1, and otherwise the value is zero.

diu_coeff_abs_level_gt1[k][b][s][v]: indicates, in the k-component, whether the non-zero mesh displacement coefficient of the vertex with the index v of the subblock with the index s of the block with the index b has an absolute value of greater than 1. In a case that the non-zero mesh displacement coefficient has an absolute value of greater than 1, the value is 1, and otherwise the value is zero. In a case that this syntax does not exist, the value is inferred to be 0.

diu_coeff_abs_level_gt2[k][b][s][v]: indicates, in the k-component, whether the non-zero mesh displacement coefficient of the vertex with the index v of the subblock with the index s of the block with the index b has an absolute value of greater than 2. In a case that the non-zero mesh displacement coefficient has an absolute value of greater than 2, the value is 1, and otherwise the value is zero. In a case that this syntax does not exist, the value is inferred to be 0.

diu_coeff_abs_level_gt3[k][b][s][v]: indicates, in the k-component, whether the non-zero mesh displacement coefficient of the vertex with the index v of the subblock with the index s of the block with the index b has an absolute value of greater than 3. In a case that the non-zero mesh displacement coefficient has an absolute value of greater than 3, the value is 1, and otherwise the value is zero. In a case that this syntax does not exist, the value is inferred to be 0.

diu_coeff_sign[k][b][s][v]: indicates, in the k-component, whether the non-zero mesh displacement coefficient of the vertex with the index v of the subblock with the index s of the block with the index b is a positive number. In a case that the non-zero mesh displacement coefficient is a positive number, the value is 1, and otherwise the value is 0. In a case that this syntax does not exist, the value is inferred to be 1.

diu_coeff_abs_level_rem[k][b][s][v]: in the k component, a value obtained by subtracting 4 from the absolute value of the non-zero mesh displacement coefficient of the vertex with the index v of the subblock with the index s of the block with the index b. In a case that this syntax does not exist, the value is inferred to be 0.

The mesh displacement decoder 305 decodes diu_last_sig_coeff for each component of the mesh displacement. Then, the number lodCount of lods of the k-component is derived from diu_last_sig_coeff[k].

The mesh displacement decoder 305 decodes diu_coded_block_flag for each detail level (lod) of the mesh displacement. Then, the number vertexCount of blocks b is derived from diu_coded_block_flag[k][b].

The mesh displacement decoder 305 decodes diu_coded_subblock_flag for each block of the mesh displacement. Then, the start position vStart of the subblock s is derived from diu_coded_subblock_flag[k][b][s].

The mesh displacement decoder 305 decodes diu_coeff_abs_level_gt0 for each subblock of the mesh displacement, and decodes subsequent diu_coeff_sign and diu_coeff_abs_level_gt1 in a case that diu_coeff_abs_level_gt0 is a predetermined value (for example, other than 0).

In a case that diu_coeff_abs_level_gt1 is a predetermined value (for example, other than 0), the mesh displacement decoder 305 decodes subsequent diu_coeff_abs_level_gt2.

In a case that diu_coeff_abs_level_gt2 is a predetermined value (for example, other than 0), the mesh displacement decoder 305 decodes subsequent diu_coeff_abs_level_gt3.

In a case that diu_coeff_abs_level_gt3 is a predetermined value (for example, other than 0), the mesh displacement decoder 305 decodes subsequent diu_coeff_abs_level_rem.

Operation of Mesh Displacement Decoder

The arithmetic decoder 3051 decodes the mesh displacement coding stream arithmetically coded according to a value (context) indicating a random variable, and outputs a binary signal. The binary signal may be an alpha code, or may be a k-th order exponential Golomb code (k-th order Exp-Golomb-code). The Golomb coding contains prefix and suffix codes. prefix is an exponentially increasing value, and suffix is the remainder of the exponentially increasing value.

The de-binarization unit 3052 decodes the binary signal to obtain a quantized mesh displacement Qdisp, which is a multi-valued signal.

The context selection unit 3056 (context memory) contains a memory for holding a context, derives a context used for arithmetic decoding of the mesh displacement depending on a state, and updates the value as necessary. Depending on a frame type ft (e.g., 0: intra frame, 1: inter frame), the level of the mesh subdivision lod (level of detail) and the component dim of a mesh displacement vector, the arithmetic decoding of each coefficient of the mesh displacement may use the following different context arrays. The context includes at least a variable indicating the probability of occurrence of a binary signal.

ctxLastSigCoeff[numFT] [numDim]
ctxCodedBlock[numFT] [numLOD] [numDim]
ctxCodedSubBlock[numFT] [numLOD] [numDim]
ctxCoeffGtN[numFT] [numLOD] [MAX_GIN+1] [numDim]
ctxCoeffRemPrefix[numFT] [numLOD] [numDim]

Note that a static context with a fixed probability without context update is referred to as a ctxStatic. The syntax component indicated by ctxStatic may be decoded without using a context.

Here, numFT is the number of frame types and numFT=2.

numLOD is the maximum number of levels of detail for mesh subdivision and may be the value of a syntax element asps_vdmc_ext_subdivision_iteration_count or afps_vdmc_ext_subdivision_iteration_count decoded from the bitstream or numLOD may be 4.

numLOD=asps_vdmc_ext_subdivision_iteration_count
numLOD=afps_vdmc_ext_subdivision_iteration_count numDim is the number of dimensions of the mesh displacement vector, and may be the value of a syntax element asps_vdmc_ext_1d_displacement_flag or afps_vdmc_ext_1d_displacement_flag decoded from the bitstream, or numDim may be 3.

numDim=asps_vdsc_ext_Id_displacement_flag? 1:3
numDim=afps_vdmc_ext_Id_displacement_flag? 1:3

The maximum value MAX_GTN of a threshold for the coefficient is 3.

ctxLastSigCoeff [numFT] [numDim] is an array of contexts used to decode a syntax element diu_last_sig_coeff. The arithmetic decoder 3051 uses the value of ctxLastSigCoeff[ft][dim] to decode diu_last_sig_coeff in the frame type ft and the dimension dim of the mesh displacement vector.

ctxCodedBlock[numFT][numLOD][numDim] is an array of contexts used to decode a syntax element diu_coded_block_flag. The arithmetic decoder 3051 uses the value of ctxCodedBlock[ft][lod][dim] to decode diu_coded_block_flag in the frame type ft, the detail level lod, and the dimension dim of the mesh displacement vector.

ctxCodedSubBlock[numFT][numLOD][numDim] is an array of contexts used to decode the syntax element diu_ coded_subblock_flag. The arithmetic decoder 3051 uses the value of ctxCodedSubBlock[ft][lod][dim] to decode diu_coded_subblock_flag in the frame type ft, the detail level lod, and the dimension dim of the mesh displacement vector.

ctxCoeffGtN[numFT][numLOD][MAX_GTN+1][numDim] is an array of contexts used for decoding syntax elements diu_coeff_abs_level_gtN (N is replaced by 0, 1, 2, MAX_GTN). The arithmetic decoder 3051 decodes diu_coeff_abs_level_gtN at the frame type ft, the detail level lod, and the dimension dim of the mesh displacement vector using the value of ctxCoeffGtN[ft][lod][N][dim].

The arithmetic decoder 3051 decodes diu_coeff_sign in the frame type ft, the detail level lod, and the dimension dim of the mesh displacement vector using the bypass.

ctxCoeffRemPrefix[numFT][numLOD][numDim] is an array of contexts used to decode the syntax elements diu_coeff_abs_level_rem. The arithmetic decoder 3051 uses the value of ctxCoeffRemPrefix[ft][lod][dim] to decode diu_coeff_abs_level_rem in the frame type ft, the detail level lod, and the dimension dim of the mesh displacement vector.

The context initialization unit 3057 initializes a context (probability of occurrence of a binary signal). The context may be initialized for each frame or for each group of one or more frames (Group of Frames, GoF). In a case that the context is initialized for each frame, random access to any frame can be easily performed because there is no dependency of the context between frames. Initialization of the context for each GoF allows the coding efficiency to be further improved compared to initialization of the context for each frame because the former is less frequent than the latter.

Processing of Deriving Mesh Displacement

The mesh displacement decoder 305 decodes the syntax elements diu_last_sig_coeff, diu_coded_block_flag, diu_coded_subblock_flag, diu_coeff_abs_level_gt0, diu_coeff_abs_level_gt1, diu_coeff_abs_level_gt2, diu_coeff_abs_level_gt3, diu_coeff_abs_level_rem, and diu_coeff_sign to derive the mesh displacement Qdisp, by using the following processing.

Here, the mesh displacement decoder 305 decodes diu_last_sig_coeff in units of components. The diu_coded_block_flag is decoded in units of LOD (units of blocks), and the diu_coded_subblock_flag is decoded in units of subblocks of the subBlockSize size. In a case that diu_coded_subblock_flag is a predetermined value, the mesh displacement coefficient in the subblock is decoded.

```
for (k = 0; k < numDim: k++) { // dimension (component) loop
  // decode diu_last_sig_coeff
  diu_last_sig_coeff[k] = decodeExpGolumn(ctxLastSigCoeff[ft][k])
  dispOffset = 0
  for (b = 0; b <numLOD; b++) { // Level of Detail loop, block loop
    // decode diu_coded_block_flag
    diu_coded_block_flag[k][b] = decode(ctxCodedBlock[ft][b][k])
    if (diu_coded_block_flag[k][b]) {
      numSubBlocks = dispCount[b] / subBlockSize + 1
      for (s = 0; s < numSubBlocks; s++) { // subblock loop
        // decode diu_coded_subblock_flag
        diu_coded_subblock_flag[k][b][s] = decode(ctxCodedSubBlock[ft][b][k])
        if (diu_coded_subblock_flag[k][b][s]) {
          for (v = 0; v < subBlockSize: v++) { // coefficient loop within subblock
            value = 0
            // decode diu_coeff_abs_level_gt0
            diu_coeff_abs_level_gt0[k][b][s][v] = decode(ctxCoeffGtN[ft][b][0][k])
            if (diu_coeff_abs_level_gt0[k][b][s][v]) {
              value++
              // decode diu_coeff_sign
              diu_coeff_sign[k][b][s][v] = decode(ctxStatic)
              // decode diu_coeff_abs_level_gt1
              diu_coeff_abs_level_gt1[k][b][s][v] = decode(ctxCoeffGtN[ft][b][1][k]
)
              if (diu_coeff_abs_level_gt1[k][b][s][v]) {
                value++
                // decode diu_coeff_abs_level_gt2
                diu_coeff_abs_level_gt2[k][b][s][v] = decode(ctxCoeffGtN[ft][b][2][
k])
                if (diu_coeff_abs_level_gt2[k][b][s][v]) {
                  value++
                  // decode diu_coeff_abs_level_gt3
                  diu_coeff_abs_level_gt3[k][b][s][v] = decode(ctxCoeffGtN[ft][b][3
][k])
                  if (diu_coeff_abs_level_gt3[k][b][s][v]) {
                    // decode diu_coeff_abs_level_rem
                    diu_coeff_abs_level_rem[k][b][s][v]
                      = decodeExpGolumn(ctxCoeffRemPrefix[ft][b][k])
                    value += (1 + diu_coeff_abs_level_rem)
                  }
                }
              }
              if (diu_coeff_sign[k][b][s][v]) {
                value = -value
              }
            }
            Qdisp[dispOffset + s * subBlockSize + v][k] = value
          }
        }
      }
    }
  }
  dispOffset += dispCount[b]
```

```
    }
}
```

Here, decode( ) and decodeExpGolumn( ) are functions of using corresponding contexts as arguments to decode a 1-bit value or a k-th order Golomb code, respectively. value++ is an operation of incrementing a variable value by 1, value+=1, and value=value+1. subBlockSize is the size of the subblock. for indicates a loop. subBlockSize may use a value from 16 to 4096. For example, subBlockSize may be 100, 128, or the like. dispCount[b] is the number of mesh displacements of a detail level b. decode (ctxStatic) may use dedicated processing for bypass as decode_bypass( ).

absCoeff=diu_coeff_abs_level_gt0+diu_coeff_abs_level_gt1+diu_coeff_abs_level_gt2+diu_coeff_abs_level_gt3+diu_coeff_abs_level_rem value=absCoeff*(1-2*diu_coeff_sign)

Alternatively, the mesh displacement decoder 305 may decode the syntax elements diu_last_sig_coeff, diu_coded_block_flag, diu_coded_subblock_flag, diu_coeff_abs_level_gtN, diu_coeff_abs_level_rem, and diu_coeff_sign to derive the mesh displacement Qdisp, by using the following processing.

```
for (k = 0; k < numDim; k++) { // dimension (component) loop
  // decode diu_last_sig_coeff
  diu_last_sig_coeff[k] = decodeExpGolumn(ctxLastSigCoeff[ft][k])
  dispOffset = 0
  for (b = 0; b <numLOD; b++) { // Level of Detail loop, block loop
    // decode diu_coded_block_flag
    diu_coded_block_flag[k][b] = decode(ctxCodedBlock[ft][b][k])
    if (diu_coded_block_flag[k][b]) {
      numSubBlocks = dispCount[b] / subBlockSize + 1
      for (s = 0; s < numSubBlocks; s++) { // subblock loop
        // decode diu_coded_subblock_flag
        diu_coded_subblock_flag[k][b][s] = decode(ctxCodedSubBlock[ft][b][k])
        if (diu_coded_subblock_flag[k][b][s]) {
          for (v = 0; v < subBlockSize; v++) ( // coefficient loop within subblock
            value = 0
            // decode diu_coeff_abs_level_gt0
            diu_coeff_abs_level_gt0[k][b][s][v] = decode(ctxCoeffGtN[ft][b][0][k])
            if (diu_coeff_abs_level_gt0[k][b][s][v]) {
              // decode diu_coeff_sign
              diu_coeff_sign[k][b][s][v] = decode(ctxStatic)
              N = 1
              maxGtN = 3
              while (N <= maxGtN) {
                value++
                // decode diu_coeff_abs_level_gtN (N=1..maxGtN)
                diu_coeff_abs_level_gtN[k][b][s][v] = decode(ctxCoeffGtN[ft][b][N][k])
                if (!diu_coeff_abs_level_gtN[k][b][s][v]) break
                N++
              }
              if (diu_coeff_abs_level_gtN[k][b][s][v]) {
                // decode diu_coeff_abs_level_rem
                diu_coeff_abs_level_rem[k][b][s][v]
                  = decodeExpGolumn(ctxCoeffRemPrefix[ft][b][k])
                value += (1 + diu_coeff_abs_level_rem[k][b][s][v])
              }
              if (diu_coeff_sign[k][b][s][v]) {
                value = -value
              }
            }
            Qdisp[dispOffset + s * subBlockSize + v][k] = value
          }
        }
      }
    }
    dispOffset += dispCount[b]
  }
}
```

Instead of using the above-described pseudo code method, the mesh displacement decoder 305 may derive the value of the mesh displacement from diu_coeff_abs_level_gt0, diu_coeff_abs_level_gt1, diu_coeff_abs_level_gt2, diu_coeff_abs_level_gt3, diu_coeff_abs_level_rem, and diu_coeff_level_sign as follows. value is stored in QDisp.

Note that maxGtN is not limited to 3 and that, for example, maxGtN=2 may be used to encode/decode the syntaxes diu_coeff_abs_level_gt0, diu_coeff_abs_level_gt1, and diu_coeff_abs_level_gt2, or maxGtN=4 may be used to encode/decode the syntax elements diu_coeff_abs_level_gt0, diu_coeff_abs_level_gt1, diu_coeff_abs_level_gt2, diu_coeff_abs_level_gt3, and diu_coeff_abs_level_gt4.

Bypass Configuration

Examples in which contexts are used have been described above. However, some syntax elements may be bypass-decoded without using a context. A configuration using bypass coding and decoding is effective in reducing the memory for contexts and the amount of processing.

For example, the per-block syntax elements diu_last_sig_coeff and diu_coded_block_flag may be bypass-coded without using a context. In other words, decoding may be performed statically (or without using a context) using ctxStatic instead of ctxLastSigCoeff[numFT][numDim] or ctxCodedBlock[numFT][numLOD][numDim]. Bypass-coding and decoding these syntax elements is effective in reducing the memory for contexts and the amount of processing while maintaining the coding efficiency.

The syntax element diu_coeff_abs_level_rem, related to rem, may be decoded by bypass coding, in other words, by using ctxStatic (static context) instead of ctxCoeffRemPrefix[ft][b][k] (or without using a context). This is further effective in reducing the number of update operations and the memory required for the context. Here, a context that needs to be updated is used instead of bypass coding to decode the syntax elements diu_coeff_abs_level_gt0, diu_coeff_abs_level_gt1, diu_coeff_abs_level_gt2, and diu_coeff_abs_level_gt3 (diu_coeff_abs_level_gt4, diu_coeff_abs_level_gtN) indicating whether the coefficient exceeds a predetermined value.

Configuration Limiting Number of Context Coding Coefficients to be Decoded

Note that when contexts are used for coeff_abs_level_gt0, diu_coeff_abs_level_gt1, coeff_abs_level_gt2, and diu_coeff_abs_level_gt3 among the subBlockSize coefficients in the subblock, a maximum of 4*subBlockSize coefficients are context-coded. This complexity is reduced by counting the number of context-coded coefficients in the syntax elements other than coeff_abs_level_gt0 and diu_coeff_abs_level_gt1 (diu_coeff_abs_level_gt2 and diu_coeff_abs_level_gt3). In a case that the value is greater than or equal to a predetermined value maxContextInBlock, diu_coeff_abs_level_gt2 and diu_coeff_abs_level_gt3 may be switched from decoding using a context to decoding using no context (using a bypass or static context).

In a case that counting the number of context-coded coefficients other than coeff_abs_level_gt0 and diu_coeff_abs_level_gt1 results in a predetermined value maxContextInBlock or greater, direct decoding of diu_coeff_level_rem may be performed instead of decoding of diu_coeff_abs_level_gt2 and diu_coeff_abs_level_gt3. In this case, initialization is performed such that countGT=0 before the loop of the subblock, and countGT is incremented by 1 each time din_coeff_abs_level_gt2 and diu_coeff_abs_level_gt3 are decoded in the subblock. Furthermore, diu_coeff_abs_level_gt2 and diu_coeff_abs_level_gt3 are decoded only in a case that countGT<maxContextInBlock. A syntax table (partial excerpt) is as follows:

```
if (diu_coded_subblock_flag[k][b][s]) {
  for (v = vStart; v < subBlockSize; v++) {
    countGT = 0
    remainFlag = 0
    diu_coeff_abs_level_gt0[k][b][s][v]
    if (diu_coeff_abs_level_gt0[k][b][s][v])
      diu_coeff_sign[k][b][s][v]
      diu_coeff_abs_level_gt1[k][b][s][v]
      if (diu_coeff_abs_level_gt1[k][b][s][v]) {
        if (countGT < maxContextInBlock) {
          diu_coeff_abs_level_gt2[k][b][s][v]
          countGT += 1
          if (diu_coeff_abs_level_gt2[k][b][s][v]) {
            if (countGT < maxContextInBlock) {
              diu_coeff_abs_level_gt3[k][b][s][v]
              countGT += 1
              if (diu_coeff_abs_level_gt3[k][b][s][v]) remainFlag = 1
            } else {
              remainFlag = 1
            }
          }
        } else {
          remainFlag = 1
        }
      }
      if (remainFlag) {
        diu_coeff_abs_rem[k][b][s][v]
      }
      value = (1 + diu_coeff_abs_level_gt1[k][b][s][v] + diu_coeff_abs_level_gt2[k][b][s][v] + diu_coeff_abs_level_gt3[k][b][s][v] + diu_coeff_abs_rem[k][b][s][v]) * (2 - diu_coeff_sign[k][b][s][v])
  }
}
```

In a case that a value smaller than a predetermined value maxContextInBlock results from counting of the number of decoding operations for the syntax elements including diu_coeff_abs_level_gt0, diu_coeff_abs_level_gt1, diu_coeff_abs_level_gt2, and diu_coeff_abs_level_gt3, diu_coeff_abs_level_gt2 and diu_coeff_abs_level_gt3 may be decoded.

(Configuration Using Context for Some Bins of Prefix)

FIG. 16A illustrates an example of a syntax structure of mesh displacements. A difference from FIG. 15 is that no syntaxes are provided for gt2(diu_coeff_abs_level_gt2) and gt3(diu_coeff_abs_level_gt3), and the mesh displacement decoder 305 decodes diu_coeff_abs_rem in a case that diu_coeff_abs_level_gt1 is true. FIG. 16B illustrates a configuration of a context used by the mesh displacement decoder 305. The mesh displacement decoder 305 decodes diu_coeff_abs_level_gt0 and diu_coeff_abs_level_gt1 using a context, decodes diu_coeff_sign using a bypass, decodes a part of the beginning of the prefix of diu_coeff_abs_level_rem using a context, decodes the rest of the prefix using a bypass, and decodes the suffix of diu_coeff_abs_level_rem using a bypass. In particular, prefix bin==0 and prefix bin==1 may be decoded using different contexts, and bin>=2 and the subsequent parts of the prefix may be decoded using a bypass. Prefix bin==0, prefix bin==1, and prefix bin==2 may be decoded using different contexts, and bin>=3 and the subsequent parts of the prefix may be decoded using a bypass. As described above, only up to two (or three) contexts are used even in a case that a value to be ExpGolomb-coded increases, and thus this enables a reduction in complexity compared to a case in which contexts are used in all bins for the remainder (diu_coeff_abs_level_rem). This also enables higher efficiency to be achieved than the case where a bypass is used in all bins.

For example, setting maxContextInBlock=subBlockSize/4 enables the maximum number of context-coded bins (worst case) to be reduced from 4*subBlockSize to subBlockSize*(2+1/4).

Only in a case that a value smaller than the predetermined value maxContextInBlock results from counting of the number of decoding operations for the syntax elements including diu_coeff_abs_level_gt0, diu_coeff_abs_level_gt1, diu_coeff_abs_level_gt2, and diu_coeff_abs_level_gt3, diu_coeff_abs_level_gt2 and diu_coeff_abs_level_gt3 may be decoded.

The inverse quantization unit 3053 performs inverse quantization based on the quantization scale value iscale to derive a transformed mesh displacement Tdisp (subjected to, for example, wavelet transform). Tdisp may be in a Cartesian coordinate system or in a local coordinate system. iscale is a value derived from a quantization parameter for each component of a mesh displacement image.

$$Tdisp[0][] = (Qdisp[0][] * iscale[0] + iscaleOffset >> iscaleShift$$

$$Tdisp[1][] = (Qdisp[1][] * iscale[1] + iscaleOffset >> iscaleShift$$

$$Tdisp[2][] = (Qdisp[2][] * iscale[2] + iscaleOffset >> iscaleShift$$

Here, iscaleOffset=1<<(iscaleShift-1). iscaleShift may be a predetermined constant, or may be a value obtained by coding at a sequence level, a picture/frame level, a tile/patch level, or the like and decoding coded data.

The inverse transform processing unit 3054 performs inverse transform g (for example, inverse wavelet transform) to derive a mesh displacement d.

d[0][ ]=g(Tdisp[0][ ])
d[1][ ]=g(Tdisp[1][ ])
d[2][ ]=g(Tdisp[2][ ])

The coordinate system conversion unit 3055 converts the mesh displacement (coordinate system of the mesh displacement) into the Cartesian coordinate system based on the value of coordinate system conversion information displacementCoordinateSystem. To be more specific, in a case that displacementCoordinateSystem==1, the displacement in the local coordinate system is converted into the displacement in the Cartesian coordinate system. Here, d is a three dimensional vector indicating a mesh displacement before coordinate system conversion. disp is a three dimensional vector indicating a mesh displacement after coordinate system conversion, and is in the Cartesian coordinate system. n_vec, t_vec, and b_vec are three dimensional vectors (in the Cartesian coordinate system) corresponding to the axes of the local coordinate system of the target region or the target vertex.

```
if (displacementCoordinateSystem == 0) {
    disp = d
} else if (displacementCoordinateSystem == 1) {
    disp = d[0] * n_vec + d[1] * t_vec + d[2] * b_vec
}
```

The derivation method indicated by the above-described vector multiplication can be individually expressed by scalars as follows.

```
if (displacementCoordinateSystem == 0) {
    for (i = 0; i < 3; i++) {disp[i] = d[i]}
} else if (displacementCoordinateSystem == 1) {
    for (i = 0; i < 3; i++) {disp[i] = d[0] * n_vec[i] + d[1] * t_vec[i]
    + d[2] * b_vec[i]}
}
```

Note that, with disp=d, the same variable names may be assigned before and after the conversion and that the value of d may be updated by coordinate conversion.

Alternatively, the configuration may be as follows.

```
if (displacementCoordinateSystem == 0) {
    disp = d
} else if (displacementCoordinateSystem == 1) {
    disp = d[0] * n_vec + d[1] * t_vec + d[2] * b_vec
} else if (displacementCoordinateSystem == 2) {
    disp = d[0] * n_vec2 + d[1] * t_vec2 + d[2] * b_vec2
}
```

Here, n_vec2, t_vec2, and b_vec2 are three dimensional vectors (in the Cartesian coordinate system) corresponding to the axes of the local coordinate system of an adjacent region.

The configuration may also be as follows.

```
if (displacementCoordinateSystem == 0) {
    disp = d
} else if (displacementCoordinateSystem == 1) {
    disp = d[0] * n_vec3 + d[1] * t_vec3 + d[2] * b_vec3
}
```

Here, n_vec3, t_vec3, and b_vec3 are three dimensional vectors (in the Cartesian coordinate system) corresponding to the respective axes of the local coordinate system of a target region in which fluctuation is suppressed. For example, a vector in the coordinate system used for decoding is derived from the previous coordinate system and the current coordinate system as follows.

$$n\_vec3 = (w * n\_vec3 + (WT - w) * n\_vec) >> wShift$$

$$t\_vec3 = (w * t\_vec3 + (WT - w) * t\_vec) >> wShift$$

$$b\_vec3 = (w * b\_vec3 + (WT - w) * b\_vec) >> wShift$$

Here, for example, wShift=2, 3, 4, WT=1<<wShift, and w=1 . . . WT-1. For example, in a case that w=3 and wShift=3, $$n\_vec3 = (3*n\_vec3 + 5*n\_vec) >> 3$$

$$t\_vec3 = (3*t\_vec3 + 5*t\_vec) >> 3$$

$$b\_vec3 = (3*b\_vec3 + 5*b\_vec) >> 3$$

The vector may be selected according to the value of the coordinate system conversion information displacementCoordinateSystem obtained from the coded data by decoding as in the following configuration.

```
if (displacementCoordinateSystem == 0) {
    disp = d
} else if (displacementCoordinateSystem == 1) {
    disp = d[0] * n_vec + d[1] * t_vec + d[2] * b_vec
} else if (displacementCoordinateSystem == 6) {
    disp = d[0] * n_vec3 + d[1] * t_vec3 + d[2] * b_vec3
}
```

Reconstruction of Mesh

Figure 6:
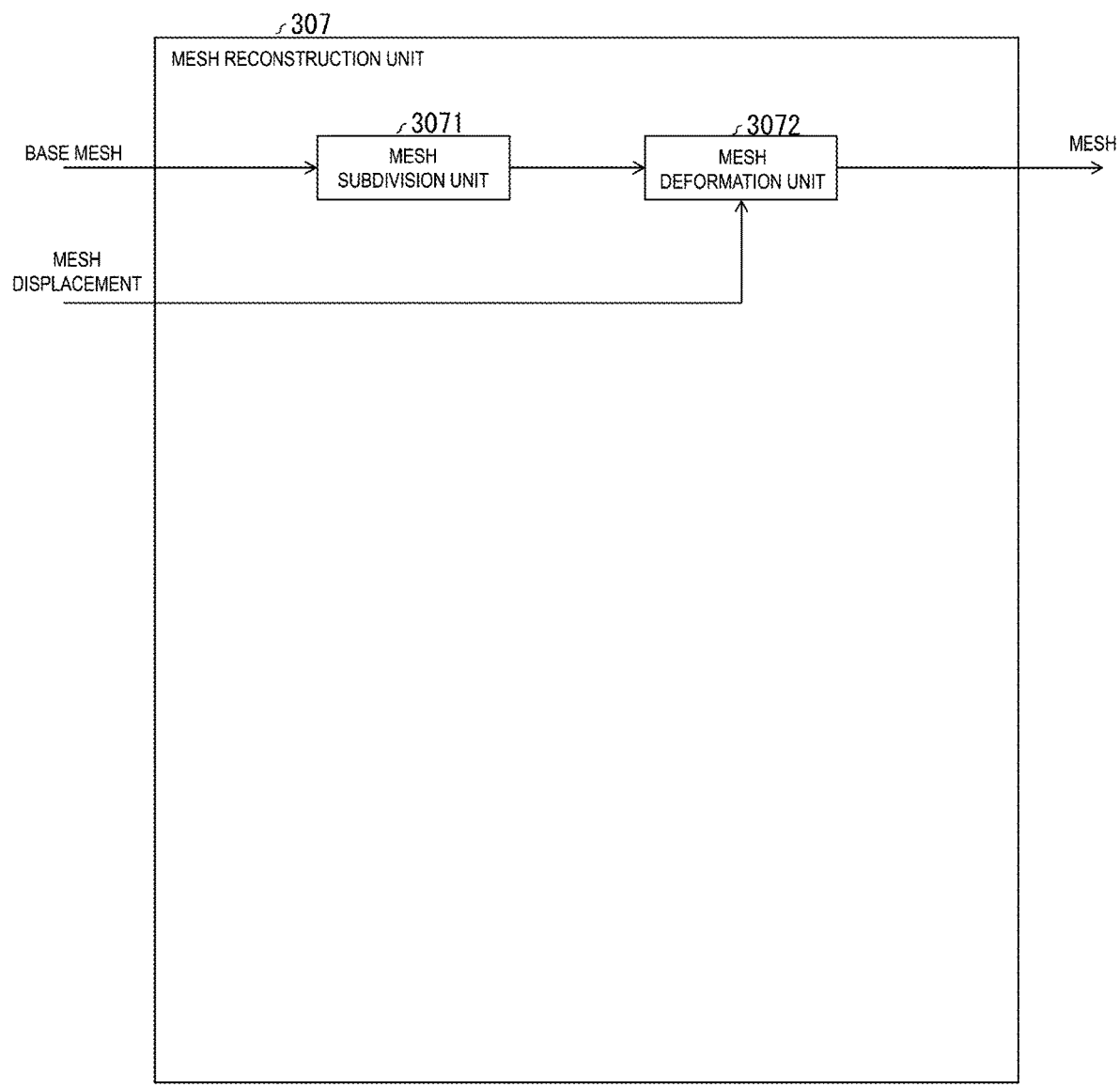
FIG. 6 is a functional block diagram illustrating a configuration of a mesh reconstruction unit 307.

FIG. 6 is a functional block diagram illustrating a configuration of the mesh reconstruction unit 307. The mesh reconstruction unit 307 contains a mesh subdivision unit 3071 and a mesh deformation unit 3072.

The mesh subdivision unit 3071 subdivides the base mesh output from the base mesh decoder 303 to generate subdivided meshes.

Figure 9A:
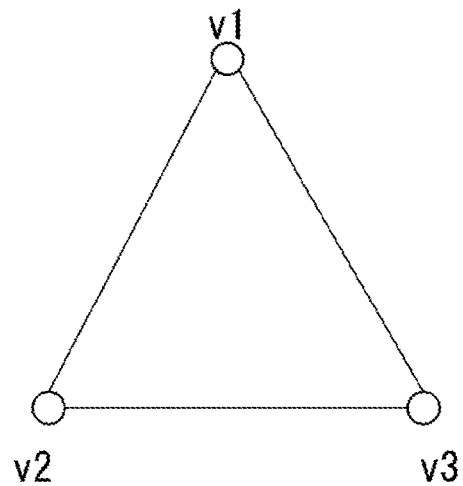
FIGS. 9A to 9C are diagrams for describing operation of the mesh reconstruction unit 307.
Figure 9B:
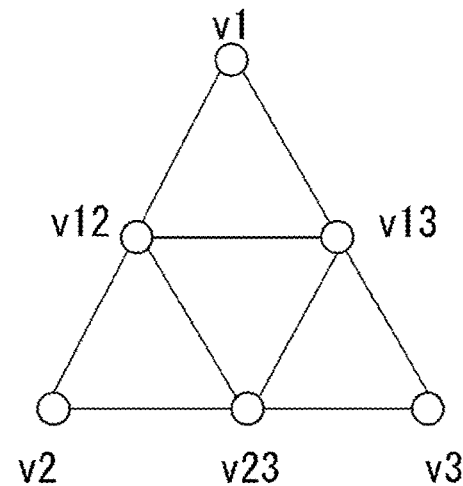

FIG. 9A illustrates a part (triangle) of the base mesh, and the triangle contains vertices v1, v2, and v3. v1, v2, and v3 are three dimensional vectors. The mesh subdivision unit 3071 generates subdivided meshes by adding new vertices v12, v13, and v23 to the middle of the respective sides of the triangle, and outputs the subdivided meshes (FIG. 9B).

$$v12 = (v1 + v2)/2$$

$$v13 = (v1 + v3)/2$$

$$v23 = (v2 + v3)/2$$

Alternatively, the following may be used.

$$v12 = (v1 + v2 + 1) >> 1$$

$$v13 = (v1 + v3 + 1) >> 1$$

$$v23 = (v2 + v3 + 1) >> 1$$

Figure 9C:
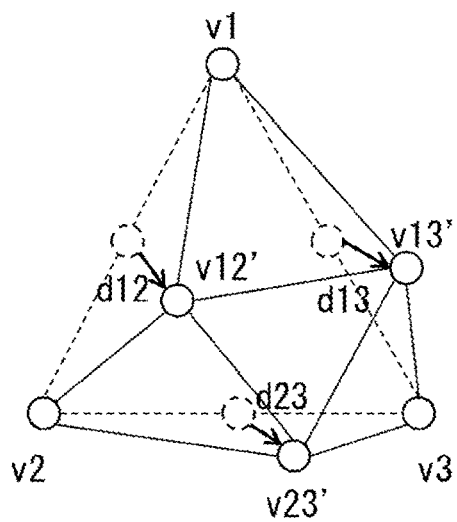

The mesh deformation unit 3072 receives the subdivided meshes and mesh displacements, generates a deformed mesh by adding the mesh displacements d12, d13, and d23, and outputs the deformed mesh (FIG. 9C). The mesh displacements are outputs from the mesh displacement decoder 305 (coordinate system conversion unit 3055). d12, d13, and d23 are mesh displacements corresponding to the vertices v12, v13, and v23 added by the mesh subdivision unit 3071.

$$v12' = v12 + d12$$

$$v13' = v13 + d13$$

$$v23' = v23 + d23$$

Note that d12=disp[0][ ], d23=disp[1][ ], and d23=disp[3][ ] may be satisfied.

(Configuration of 3D Data Coding Apparatus According to First Embodiment)

Figure 10:
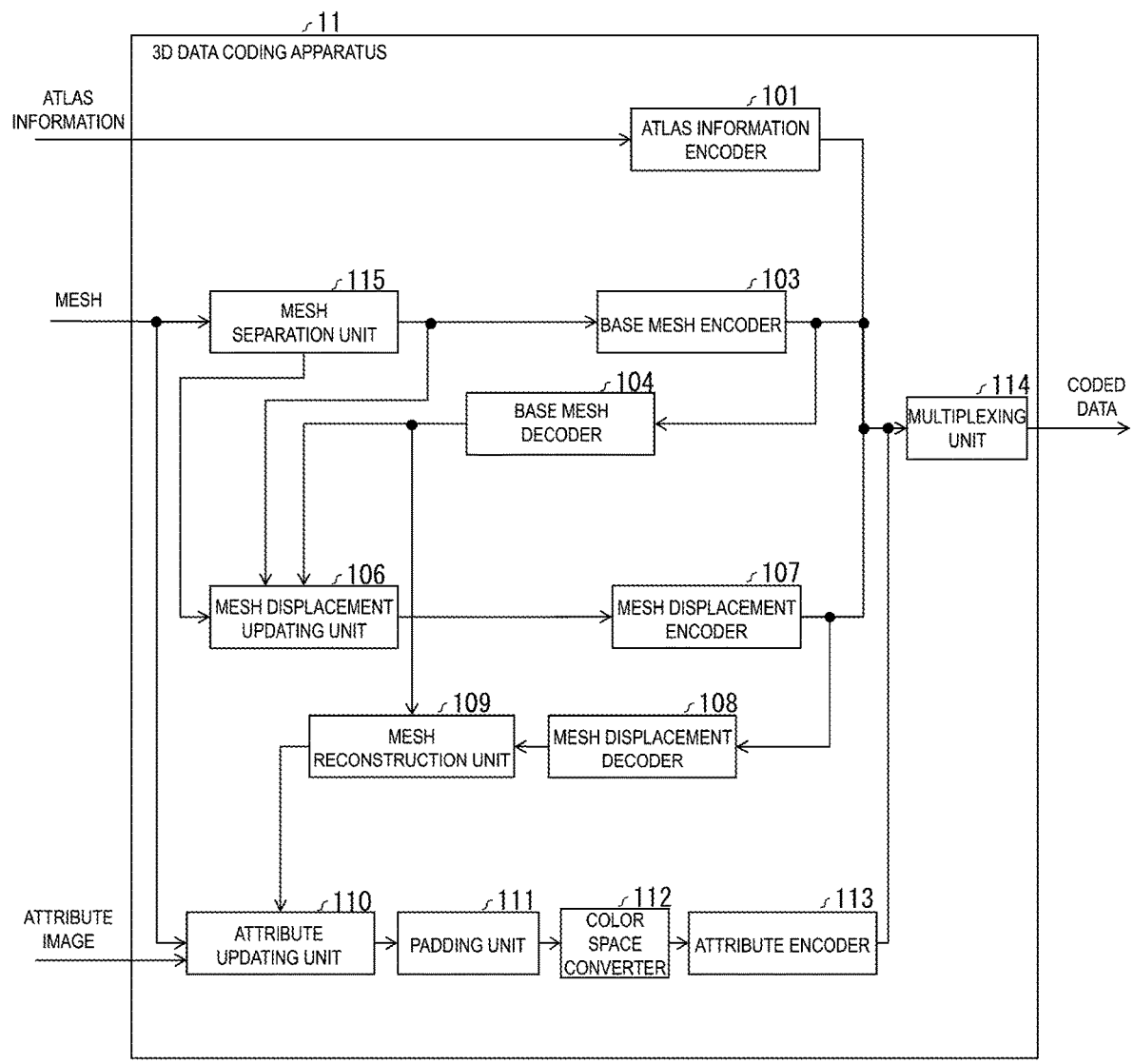
FIG. 10 is a functional block diagram illustrating a schematic configuration of a 3D data coding apparatus 11.

FIG. 10 is a functional block diagram illustrating a configuration of the 3D data coding apparatus 11 according to the first embodiment. The 3D data coding apparatus 11 contains an atlas information encoder 101, a base mesh encoder 103, a base mesh decoder 104, a mesh displacement updating unit 106, a mesh displacement encoder 107, a mesh displacement decoder 108, a mesh reconstruction unit 109, an attribute updating unit 110, a padding unit 111, a color space converter 112, an attribute encoder 113, a multiplexing unit 114, and a mesh separation unit 115. The 3D data coding apparatus 11 receives atlas information, a base mesh, mesh displacements, a mesh, and an attribute image as 3D data and outputs coded data.

The atlas information encoder 101 encodes the atlas information and outputs an atlas information coding stream.

The base mesh encoder 103 encodes the base mesh and outputs a base mesh coding stream. The coding scheme used is Draco or the like.

The base mesh decoder 104 is similar to the base mesh decoder 303, and thus description of the base mesh decoder will be omitted.

The mesh displacement updating unit 106 adjusts the mesh displacements based on the (original) base mesh and a decoded base mesh, and outputs updated mesh displacements.

The mesh displacement encoder 107 encodes the updated mesh displacements and outputs a mesh displacement coding stream.

The mesh displacement decoder 108 is similar to the mesh displacement decoder 305, and thus description of the mesh displacement decoder 108 will be omitted.

The mesh reconstruction unit 109 is similar to the mesh reconstruction unit 307, and thus description of the mesh reconstruction unit 109 will be omitted.

The attribute updating unit 110 receives the (original) mesh, the reconstructed mesh output from the mesh reconstruction unit 109 (mesh deformation unit 3072), and the attribute image, updates the attribute image into an attribute image matching the position (coordinates) of the reconstructed mesh, and outputs the updated attribute image.

The padding unit 111 receives the attribute image and performs padding processing on a region having no pixel value.

The color space converter 112 performs color space conversion from the RGB format to the YCbCr format.

The attribute encoder 113 encodes the attribute image in the YCbCr format output from the color space converter 112 and outputs an attribute video stream. The coding scheme used is VVC, HEVC, or the like.

The multiplexing unit 114 multiplexes the atlas information coding stream, the base mesh coding stream, the mesh displacement coding stream, and the attribute video stream, and outputs the resultant stream as coded data. A multiplexing scheme used is a byte stream format, ISOBMFF, or the like.

Operation of Mesh Separation Unit

The mesh separation unit 115 generates, from a mesh, a base mesh and mesh displacements.

Figure 13:
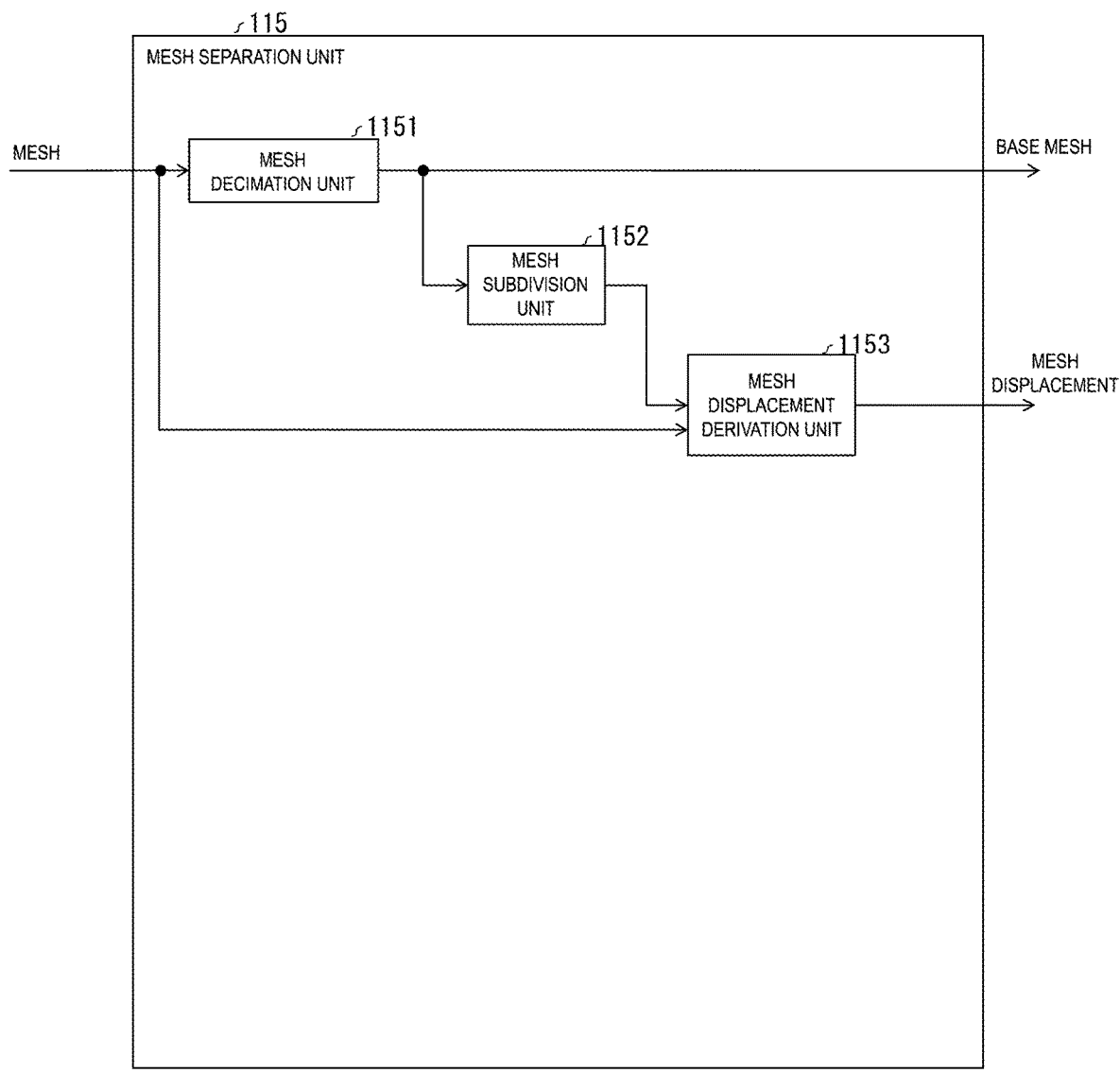
FIG. 13 is a functional block diagram illustrating a configuration of a mesh separation unit 115.

FIG. 13 is a functional block diagram illustrating a configuration of the mesh separation unit 115. The mesh separation unit 115 contains a mesh decimation unit 1151, a mesh subdivision unit 1152, and a mesh displacement derivation unit 1153.

The mesh decimation unit 1151 generates a base mesh by decimating some of the vertices from the mesh.

FIG. 14A illustrates a part of a mesh, and the mesh contains vertices v1, v2, v3, v4, v5, and v6. v1, v2, v3, v4, v5, and v6 are each a three dimensional vector. The mesh decimation unit 1151 generates a base mesh by decimating the vertices v4, v5, and v6 (FIG. 14B).

Like the mesh subdivision unit 3071, the mesh subdivision unit 1152 subdivides the base mesh to generate a subdivided mesh (FIG. 14C).

$$v4' = (v1 + v2)/2$$
$$v5' = (v1 + v3)/2$$
$$v6' = (v2 + v3)/2$$

Based on the mesh and the subdivided mesh, the mesh displacement derivation unit derives, as mesh displacements, displacements d4, d5, and d6 of the vertexes v4, v5, and v6 with respect to the vertexes v4', v5', and v6' and outputs the displacements d4, d5, and d6 (FIG. 14D).

$$d4 = v4 - v4'$$
$$d5 = v5 - v5'$$
$$d6 = v6 - v6'$$

Coding of Base Mesh

Figure 11:
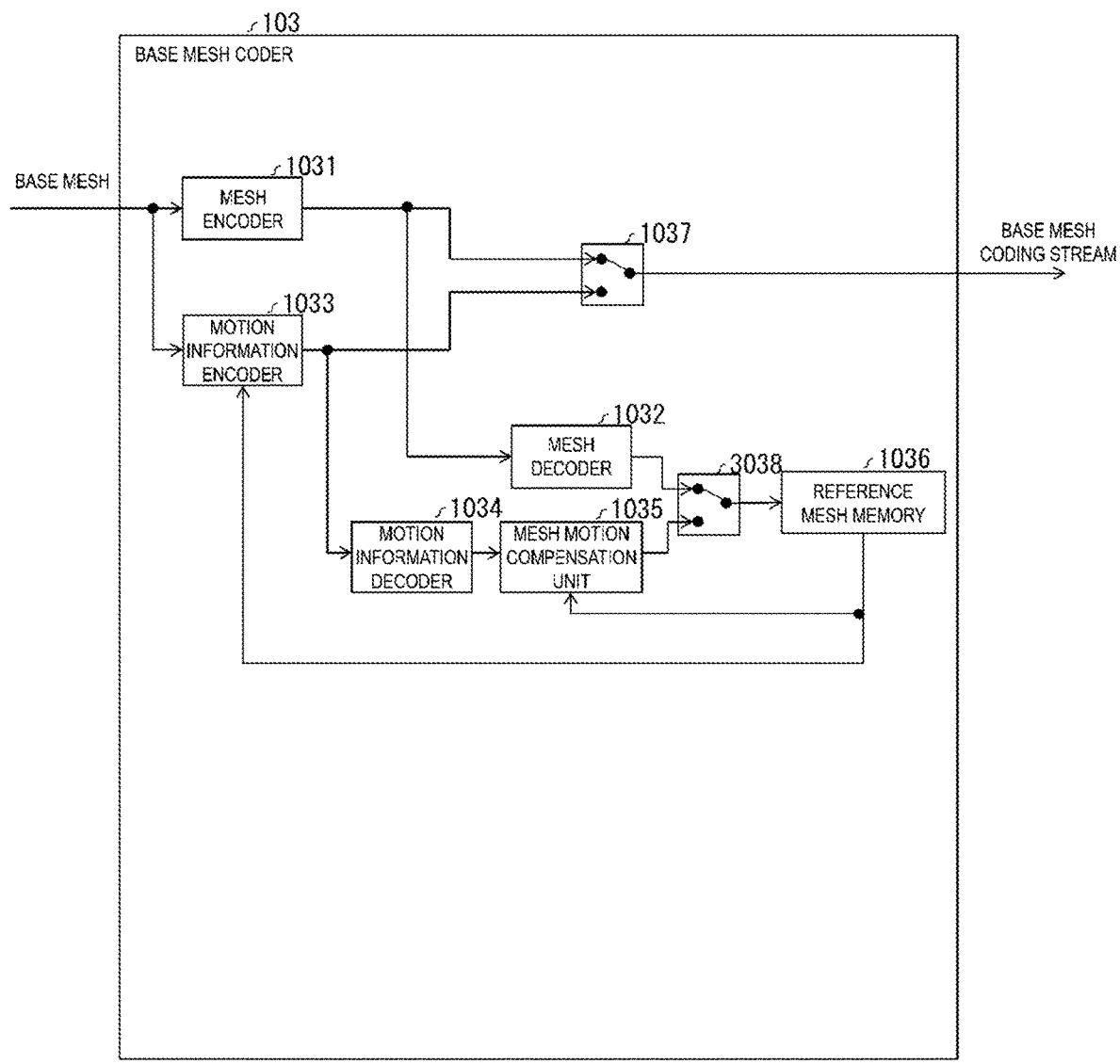
FIG. 11 is a functional block diagram illustrating a configuration of a base mesh encoder 103.

FIG. 11 is a functional block diagram illustrating a configuration of the base mesh encoder 103. The base mesh encoder 103 contains a mesh encoder 1031, a mesh decoder 1032, a motion information encoder 1033, a motion information decoder 1034, a mesh motion compensation unit 1035, a reference mesh memory 1036, a switch 1037, and a switch 1038. The base mesh encoder 103 may contain a base mesh quantization unit (not illustrated) succeeding an input for a base mesh. In a case that the base mesh is encoded (intra-coded) without referring to another base mesh (for example, an already coded base mesh), the switch 1037 and the switch 3038 are connected to the side where motion compensation is not performed. Otherwise, in a case that the base mesh is encoded with reference to another base mesh (inter-coded), the switch 1037 and the switch 3038 are connected to the side where motion compensation is performed.

The mesh encoder 1031 has an intra coding function, intra-codes the base mesh, and outputs a base mesh coding stream. The coding scheme used is Draco or the like.

The mesh decoder 1032 is similar to the mesh decoder 3031, and thus description of the mesh decoder 1032 will be omitted.

The motion information encoder 1033 has an inter-coding function, inter-codes the base mesh, and outputs a base mesh coding stream. The coding scheme used is entropy coding such as arithmetic coding.

The motion information decoder 1034 is similar to the motion information decoder 3032, and thus description of the motion information decoder 1034 will be omitted.

The mesh motion compensation unit 1035 is similar to the mesh motion compensation unit 3033, and thus description of the mesh motion compensation unit 1035 will be omitted.

The reference mesh memory 1036 is similar to the reference mesh memory 3034, and thus description of the reference mesh memory 1036 will be omitted.

Coding of Mesh Displacement

Figure 12:
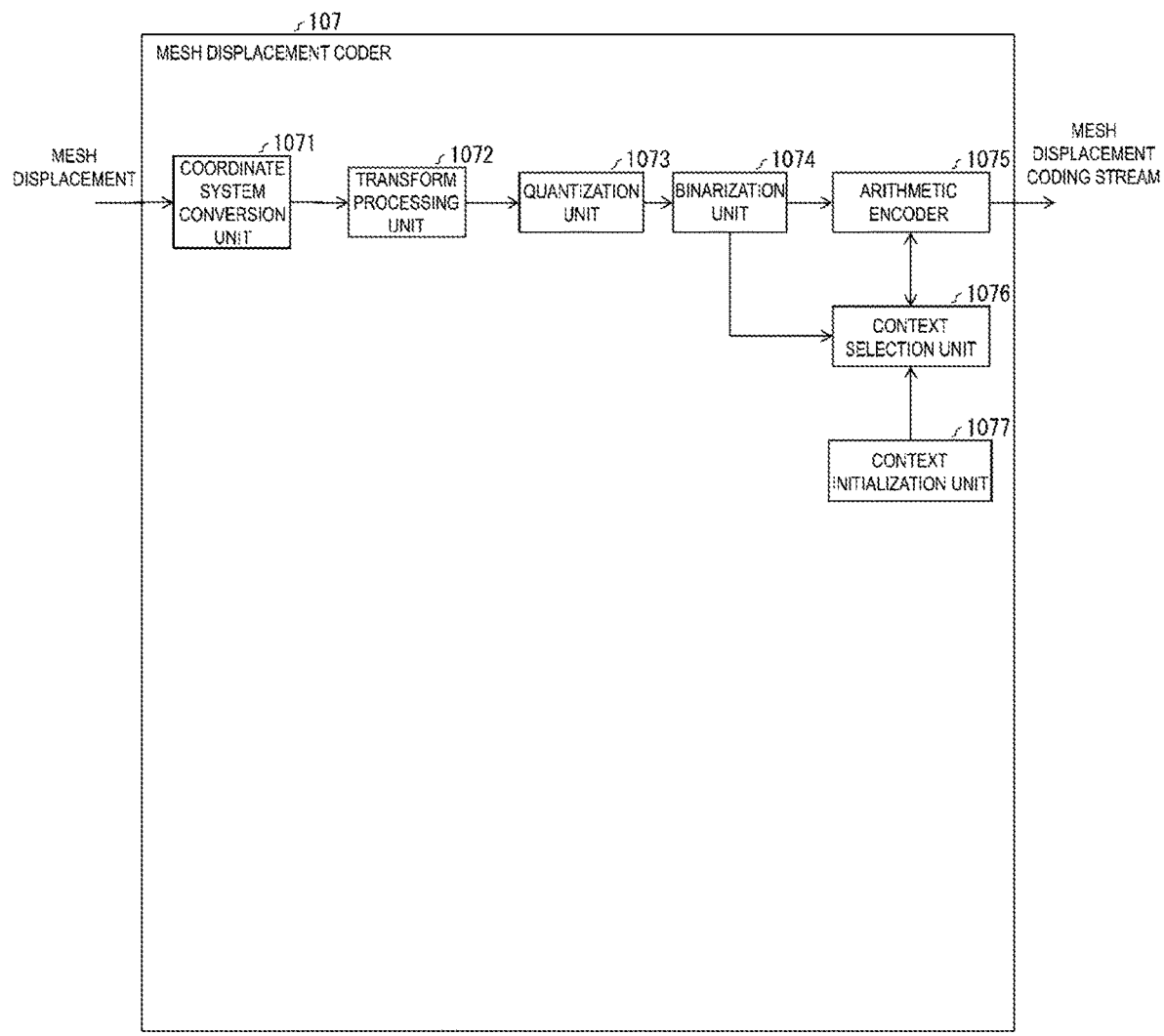
FIG. 12 is a functional block diagram illustrating a configuration of a mesh displacement encoder 107.

FIG. 12 is a functional block diagram illustrating a configuration of the mesh displacement encoder 107. The mesh displacement encoder 107 contains a coordinate system converter 1071, a transform processing unit 1072, a quantization unit 1073, a binarization unit 1074, an arithmetic encoder 1075, a context selection unit 1076, and a context initialization unit 1077.

Based on the value of the coordinate system conversion information displacementCoordinateSystem, the coordinate system converter 1071 converts the coordinate system of the mesh displacement from the Cartesian coordinate system to a coordinate system (for example, a local coordinate system) in which the displacement is encoded. Here, disp is a three dimensional vector indicating mesh displacement before coordinate system conversion, d is a three dimensional vector indicating mesh displacement after coordinate system conversion, and n_vec, t_vec, and b_vec are three dimensional vectors (in the Cartesian coordinate system) indicating the axes of the local coordinate system.

```
if (displacementCoordinateSystem == 0) {
    d = disp
} else if (displacementCoordinateSystem == 1) {
    d = (disp * n_vec, disp * t_vec, disp * b_vec)
}
```

The mesh displacement encoder 107 may update the value of displacementCoordinateSystem at the sequence level. Alternatively, the value may be updated at the picture/frame level. The initial value is 0, indicating the Cartesian coordinate system.

In a case that displacementCoordinateSystem is updated at the sequence level, the syntax of the configuration of FIG. 7 is used.

asps_vdmc_ext_displacement_coordinate_system is set equal to 0 for the Cartesian coordinate system and set equal to 1 for the local coordinate system.

In a case that the displacementCoordinateSystem is changed at the picture/frame level, the syntax of the structure of FIG. 8 is used.

afps_vdmc_ext_displacement_coordinate_system_enable_flag is set equal to 1 in a case that the coordinate system is updated and set equal to 0 in a case that the coordinate system is not updated. afps_vdmc_ext_displacement_coordinate_system is set equal to 0 for the Cartesian coordinate system and set equal to 1 for the local coordinate system.

The transform processing unit 1072 performs transform f (for example, wavelet transform) to derive a transformed mesh displacement Tdisp.

Tdisp[0][ ]=f(d[0][ ])
Tdisp[1][ ]=f(d[1][ ])
Tdisp[2][ ]=f(d[2][ ])

The quantization unit 1073 performs quantization based on a quantization scale value scale derived from the quantization parameter for each component of the mesh displacement, and derives the quantized mesh displacement Qdisp.

$$Qdisp[0][] = Tdisp[0][]/\text{scale}[0]$$
$$Qdisp[1][] = Tdisp[1][]/\text{scale}[1]$$
$$Qdisp[2][] = Tdisp[2][]/\text{scale}[2]$$

Alternatively, the scale value may be approximated by a power of 2, and Qdisp may be derived by the following equation.

$$scale[i] = 1 << scale2[i]$$

$$Qdisp[0][] = Tdisp[0][] >> scale2[0]$$

$$Qdisp[1][] = Tdisp[1][] >> scale2[1]$$

$$Qdisp[2][] = Tdisp[2][] >> scale2[2]$$

The binarization unit 1074 encodes the quantized mesh displacement Qdisp, which is a multi-valued signal, into a binary signal. The binary signal may be a k-th order exponential Golomb code.

The arithmetic encoder 1075 performs arithmetic coding on the binary signal and outputs a mesh displacement coding stream.

The context selection unit 1076 is similar to the context selection unit 3056, and thus description of the context selection unit 1076 will be omitted.

The context initialization unit 1077 is similar to the context initialization unit 3057, and thus description of the context initialization unit 1077 will be omitted.

An example in which contexts are used will be described here. However, some syntax elements may be bypass-coded without using a context. A configuration performing bypass coding is effective in reducing the memory for contexts and the amount of processing.

For example, the syntax elements diu_last_sig_coeff, diu_coded_block_flag, diu_coeff_abs_level_rem may be bypass-coded without using a context. Bypass-coding these syntax elements is effective in reducing the memory for contexts and the amount of processing, while maintaining the coding efficiency.

The mesh displacement encoder 107 encodes the mesh displacement Qdisp by the following processing.

```
for (k = 0; k < numDim; k++) { // dimension (component) loop
   // encode diu_last_sig_coeff
   encodeExpGolumn(diu_last_sig_coeff[k], ctxLastSigCoeff[ft][k])
   if (!lastSig) continue
   dispOffset = 0
   for (b = 0; b <numLOD: b++) { // Level of Detail loop, block loop
      // encode diu_coded_block_flag
      encode(diu_coded_block_flag[k][b], ctxCodedBlock[ft][b][k])
      numBlocks = dispCount[b] / subBlockSize + 1
      for (s = 0; s < numBlocks; s++) { // subblock loop
         // encode diu_coded_subblock_flag
         encode(diu_coded_subblock_flag[k][b][s], ctxCodedSubBlock[ft][b][k])
         for (v = 0; v < subBlockSize: v++) { // coefficient loop within subblock
            // encode diu_coeff_abs_level_gt0
            d = Qdisp[dispOffset + s * subBlockSize + v][k]
            encode(d != 0, ctxCoeffGtN[ft][b][0][k])
            if (!d) continue
            // encode diu_coeff_sign
            encode(d < 0, ctxSign[ft][b][k])
            d = abs(d) − 1
            // encode diu_coeff_abs_level_gt1
            encode(d != 0, ctxCoeffGtN[ft][b][1][k])
            if (!d) continue
            d = abs(d) − 1
            // encode diu_coeff_abs_level_gt2
            encode(d != 0, ctxCoeffGtN[ft][b][2][k])
            if (!d) continue
            d = abs(d) − 1
            // encode diu_coeff_abs_level_gt3
            encode(d != 0, ctxCoeffGtN[ft][b][3][k])
            if (!d) continue
            // encode diu_coeff_abs_level_rem
            encodeExpGolumn(−−d, ctxCoeffRemPrefix[ft][b][k])
         }
      }
      dispOffset += dispCount[b]
   }
}
```

Here, encode ( ) and encodeExpColumn ( ) are functions of using values and corresponding contexts as arguments to arithmetically encode a 1-bit value and a binary string of the kth-order Golomb code, respectively. dispCount[b] is the number of mesh displacements of the detail level b. lastSig is a flag indicating whether the current coefficient is the last non-zero coefficient in the subblock in scan order. lastSig=0 indicates that the current coefficient is not the last non-zero coefficient in the subblock in scan order. lastSig=1 indicates that the current coefficient is the last non-zero coefficient in the subblock in scan order.

Alternatively, the mesh displacement Qdisp may be encoded by the following processing.

```
for (k = 0; k < numDim; k++) { // dimension (component) loop
  // encode diu_last_sig_coeff
  encodeExpGolumn(diu_last_sig_coeff[k], ctxLastSigCoeff[ft][k])
  if (!lastSig) continue
  dispOffset = 0
  for (b = 0; b <numLOD; b++) { // Level of Detail loop, block loop
    // encode diu_coded_block_flag
    encode(diu_coded_block_flag[k][b], ctxCodedBlock[ft][b][k])
    numBlocks = dispCount[b] / subBlockSize + 1
    for (s = 0; s < numBlocks; s++) { // subblock loop
      // encode diu_coded_subblock_flag
      encode(diu_coded_subblock_flag[k][b][s], ctxCodedSubBlock[ft][b][k])
      for (v = 0; v < subBlockSize; v++) { // coefficient loop within subblock
        // encode diu_coeff_abs_level_gt0
        d = Qdisp[dispOffset + s * subBlockSize + v][k]
        encode(d != 0, ctxCoeffGtN[ft][b][0][k])
        if (!d) continue
        // encode diu_coeff_sign
        encode(d < 0, ctxSign[ft][b][k])
        N = 1
        maxGtN = 3
        while (N <= maxGtN) {
          d = abs(d) - 1
          // encode diu_coeff_abs_level_gtN (N=1..maxGtN)
          encode(d != 0, ctxCoeffGtN[ft][b][N][k])
          if (!d) break
          N++
        }
        if (d) {
          // encode diu_coeff_abs_level_rem
          encodeExpGolumn(--d, ctxCoeffRemPrefix[ft][b][k])
        }
      }
    }
    dispOffset += dispCount[b]
  }
}
```

Note that maxGtN is not limited to 3 and that, for example, maxGtN=2 may be used to encode the syntaxes diu_coeff_abs_level_gt0, diu_coeff_abs_level_gt1, and diu_coeff_abs_level_gt2, or maxGtN=4 may be used to encode the syntaxes diu_coeff_abs_level_gt0, diu_coeff_abs_level_gt1, diu_coeff_abs_level_gt2, diu_coeff_abs_level_gt3, and diu_coeff_abs_level_gt4.

The embodiment of the present invention has been described in detail above referring to the drawings, but the specific configuration is not limited to the above embodiment and various amendments can be made to a design that fall within the scope that does not depart from the gist of the present invention.

Application Examples

The above-described 3D data coding apparatus 11 and the 3D data decoding apparatus 31 can be utilized being installed to various apparatuses performing transmission, reception, recording, and reconstruction of 3D data. Note that the 3D data may be natural 3D data imaged by a camera or the like, or may be artificial 3D data (including CG and GUI) generated by a computer or the like.

The embodiment of the present invention is not limited to the above-described embodiment, and various modifications are possible within the scope of the claims. That is, an embodiment obtained by combining technical means modified appropriately within the scope of the claims is also included in the technical scope of the present invention.

INDUSTRIAL APPLICABILITY

The embodiments of the present invention can be preferably applied to an 3D data decoding apparatus that decodes coded data obtained by coding 3D data, and an 3D data coding apparatus that generates coded data obtained by coding 3D data. The embodiments of the present invention can be preferably applied to a data structure of coded data generated by the 3D data coding apparatus and referred to by the 3D data decoding apparatus.

REFERENCE SIGNS LIST 11 3D data coding apparatus
101 Atlas information encoder
103 Base mesh encoder
1031 Mesh encoder
1032 Mesh decoder
1033 Motion information encoder
1034 Motion information decoder
1035 Mesh motion compensation unit
1036 Reference mesh memory
1037 Switch
1038 Switch
104 Base mesh decoder
106 Mesh displacement updating unit
107 Mesh displacement encoder
1071 Coordinate system converter
1072 Transform processing unit
1073 Quantization unit
1074 Binarization unit
1075 Arithmetic encoder
1076 Context selection unit
1077 Context initialization unit
108 Mesh displacement decoder
109 Mesh reconstruction unit
110 Attribute updating unit
111 Padding unit 112 Color space converter
113 Attribute encoder
114 Multiplexing unit
115 Mesh separation unit
1151 Mesh decimation unit
1152 Mesh subdivision unit
1153 Mesh displacement derivation unit
21 Network
31 3D data decoding apparatus
301 Demultiplexing unit
302 Atlas information decoder
303 Base mesh decoder
3031 Mesh decoder
3032 Motion information decoder
3033 Mesh motion compensation unit
3034 Reference mesh memory
3035 Switch
3036 Switch
305 Mesh displacement decoder
3051 Arithmetic decoder
3052 De-binarization unit
3053 Inverse quantization unit
3054 Inverse transform processing unit
3055 Coordinate system converter
3056 Context selection unit
3057 Context initialization unit
307 Mesh reconstruction unit
306 Attribute decoder
3071 Mesh subdivision unit
3072 Mesh deformation unit
308 Color space converter
41 3D data display apparatus

The invention claimed is:

1. A three dimensional (3D) data decoding apparatus for decoding coded data, the 3D data decoding apparatus comprising:
an arithmetic decoding circuit configured to arithmetically decode a mesh displacement vector from the coded data; and
an atlas information decoding circuit configured to decode atlas information from the coded data, wherein:
the arithmetic decoding circuit decodes, from the coded data, a first flag indicating whether a coefficient of each component of the mesh displacement vector has an absolute value of greater than 0, a second flag indicating whether the coefficient has an absolute value of greater than 1, a third flag indicating whether the coefficient has an absolute value of greater than 2, and a fourth flag indicating whether the coefficient has an absolute value of greater than 3, and
the atlas information decoding circuit decodes, from the coded data, a fifth flag indicating whether the mesh displacement vector is one dimensional.

2. The 3D data decoding apparatus according to claim 1, wherein
the arithmetic decoding circuit decodes a one dimensional mesh displacement vector based on the first flag, the second flag, the third flag, and the fourth flag when the fifth flag indicates that the mesh displacement vector is one dimensional.

3. The 3D data decoding apparatus according to claim 1, wherein
the arithmetic decoding circuit decodes a three dimensional mesh displacement vector based on the first flag, the second flag, the third flag, and the fourth flag when the fifth flag indicates that the mesh displacement vector is not one dimensional.

4. A 3D data coding apparatus for coding three dimensional (3D) data, the 3D data coding apparatus comprising:
an arithmetic encoding circuit configured to arithmetically encode a mesh displacement vector; and
an atlas information encoding circuit configured to encode atlas information, wherein:
the arithmetic encoder encoding circuit encodes, into coded data, a first flag indicating whether a coefficient of each component of the mesh displacement vector has an absolute value of greater than 0, a second flag indicating whether the coefficient has an absolute value of greater than 1, a third flag indicating whether the coefficient has an absolute value of greater than 2, and a fourth flag indicating whether the coefficient has an absolute value of greater than 3, and
the atlas information encoding circuit encodes, into the coded data, a fifth flag indicating whether the mesh displacement vector is one dimensional.

5. The 3D data coding apparatus according to claim 4, wherein
the arithmetic encoding circuit encodes a one dimensional mesh displacement vector based on the first flag, the second flag, the third flag, and the fourth flag when the fifth flag indicates that the mesh displacement vector is one dimensional.

6. The 3D data coding apparatus of claim 5, wherein
the arithmetic encoding circuit encodes a three dimensional mesh displacement vector based on the first flag, the second flag, the third flag, and the fourth flag when the fifth flag indicates that the mesh displacement vector is not one dimensional.

* * * * *